US012082580B2

(12) United States Patent
Dhawan et al.

(10) Patent No.: US 12,082,580 B2
(45) Date of Patent: *Sep. 10, 2024

(54) USE OF MULTIPLE CHARGED CATIONIC COMPOUNDS DERIVED FROM PRIMARY AMINES OR POLYAMINES FOR MICROBIAL FOULING CONTROL IN A WATER SYSTEM

(71) Applicant: ECOLAB USA INC., Saint Paul, MN (US)

(72) Inventors: Ashish Dhawan, Saint Paul, MN (US); Kun Xiong, Saint Paul, MN (US); Carter M. Silvernail, Saint Paul, MN (US); Zhengang Zong, Saint Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/304,041

(22) Filed: Jun. 14, 2021

(65) Prior Publication Data

US 2021/0298300 A1   Sep. 30, 2021

Related U.S. Application Data

(63) Continuation of application No. 16/554,435, filed on Aug. 28, 2019, now Pat. No. 11,058,111.

(60) Provisional application No. 62/724,391, filed on Aug. 29, 2018.

(51) Int. Cl.
*A01N 37/30* (2006.01)
*C02F 1/50* (2023.01)

(52) U.S. Cl.
CPC .............. *A01N 37/30* (2013.01); *C02F 1/50* (2013.01); *C02F 2303/20* (2013.01)

(58) Field of Classification Search
CPC ........ A01N 37/30; C02F 1/50; C02F 2303/20
See application file for complete search history.

(56) References Cited

U.S. PATENT DOCUMENTS

| | | | |
|---|---|---|---|
| 2,195,974 A | 4/1940 | Reppe et al. | |
| 3,077,487 A | 2/1963 | Ramsey et al. | |
| 3,793,194 A | 2/1974 | Zecher | |
| 3,794,586 A | 2/1974 | Kimura et al. | |
| 4,075,136 A | 2/1978 | Schaper | |
| 4,166,894 A | 9/1979 | Schaper | |
| 4,195,138 A | 3/1980 | Ward | |
| 4,246,030 A | 1/1981 | Lipinski | |
| 4,259,217 A | 3/1981 | Murphy | |
| 4,355,071 A | 10/1982 | Chang | |
| 4,650,000 A | 3/1987 | Andreasson et al. | |
| 4,692,315 A | 9/1987 | Greaves et al. | |
| 4,784,797 A | 11/1988 | Treybig et al. | |
| 4,798,675 A | 1/1989 | Lipinski et al. | |
| 5,019,343 A | 5/1991 | Hwa et al. | |
| 5,053,150 A | 10/1991 | Emert et al. | |
| 5,192,798 A | 3/1993 | Aiken et al. | |
| 5,399,746 A | 3/1995 | Steiger et al. | |
| 5,614,616 A | 3/1997 | Buysch et al. | |
| 5,670,464 A | 9/1997 | Kita et al. | |
| 5,738,795 A | 4/1998 | Chen | |
| 6,054,054 A | 4/2000 | Robertson et al. | |
| 6,080,323 A | 6/2000 | Yu et al. | |
| 6,238,621 B1 | 5/2001 | Kalota et al. | |
| 6,503,880 B1 | 1/2003 | Skold et al. | |
| 6,627,612 B1 | 9/2003 | O'Lenick, Jr. et al. | |
| 6,797,785 B1 | 9/2004 | Hund et al. | |
| 6,881,710 B1 | 4/2005 | O'Lenick, Jr. et al. | |
| 6,984,340 B1 | 1/2006 | Brady et al. | |
| 7,084,129 B1 | 8/2006 | Smith et al. | |
| 7,375,064 B1 | 5/2008 | O'Lenick, Jr. | |
| 7,507,399 B1 | 3/2009 | O'Lenick, Jr. | |
| 9,164,379 B2 | 10/2015 | Utsumi et al. | |
| 11,058,111 B2 | 7/2021 | Dhawan et al. | |
| 11,084,974 B2 | 8/2021 | Dhawan et al. | |
| 11,236,040 B2 | 2/2022 | Dhawan et al. | |
| 11,261,113 B2 | 3/2022 | Dhawan et al. | |
| 11,292,734 B2 | 4/2022 | Dhawan et al. | |
| 2001/0044393 A1 | 11/2001 | Peterson, Jr. et al. | |

(Continued)

FOREIGN PATENT DOCUMENTS

| | | |
|---|---|---|
| BE | 606234 A | 7/1961 |
| CA | 2357756 A1 | 7/2000 |

(Continued)

OTHER PUBLICATIONS

Pan et al (J. Membrane Science 349 (2010), 287-294).*
Bi et al., "Dendrimer-Based Demulsifiers for Polymer Flooding Oil-in-Water Emulsions", Energy Fuels, vol. 31. No 5, pp. 5395-5401, Apr. 20, 2017.
Kawakami et al., "Antibacterial Activity of Radial Compounds with Peripheral Quaternary Ammonium Units", Transactions of the Materials Research Society of Japan, vol. 35[4] pp. 885-887, 2010.
Krämer et al., "Dendritic polyamines: simple access to new materials with defined treelike structures for application in nonviral gene delivery", Chembiochem, vol. 5(8), pp. 1081-1087, Aug. 6, 2004.
Marshall, I.G., "The neuromuscular blocking action of some NNN-tris and NN-bis-onium esters", European Journal of Pharmacology, vol. 2, Issue 4, pp. 258-264, Feb. 1968.

(Continued)

*Primary Examiner* — Shirley V Gembeh
(74) *Attorney, Agent, or Firm* — McKee, Voorhees & Sease, PLC

(57) ABSTRACT

Disclosed herein are the methods of using specific dicationic or multiple charged cationic compounds, which are derived from primary amine or polyamines through an aza-Michael addition with an α, β-unsaturated carbonyl compound or from polyamines through both an aza-Michael addition with an α, β-unsaturated carbonyl compound and a ring-opening reaction with an epoxide, in a fouling control composition to reduce microbial and/biofilm growth in a water system. The disclosed methods or compositions are found to be more effective than those methods or compositions including commonly used single quaternary compounds for reducing microbial or biofilm growth in water systems.

32 Claims, 7 Drawing Sheets

(56) References Cited

U.S. PATENT DOCUMENTS

| | | |
|---|---|---|
| 2002/0104349 A1 | 8/2002 | Richter et al. |
| 2002/0155978 A1 | 10/2002 | Man et al. |
| 2004/0009139 A1 | 1/2004 | Oldenhove |
| 2005/0061197 A1 | 3/2005 | Nalepa |
| 2005/0215461 A1 | 9/2005 | Gluck et al. |
| 2005/0261484 A1 | 11/2005 | Pascaly et al. |
| 2006/0008496 A1 | 1/2006 | Kulkarni et al. |
| 2006/0231505 A1 | 10/2006 | Mayer et al. |
| 2006/0289164 A1 | 12/2006 | Smith et al. |
| 2006/0289359 A1 | 12/2006 | Manek et al. |
| 2009/0236571 A1 | 9/2009 | Cohen |
| 2010/0004316 A1 | 1/2010 | Lu et al. |
| 2010/0029530 A1 | 2/2010 | Whiteley |
| 2010/0305014 A1 | 12/2010 | Miralles et al. |
| 2011/0112007 A1 | 5/2011 | Hodge et al. |
| 2011/0296746 A1 | 12/2011 | Hernandez Altamirano et al. |
| 2012/0053111 A1 | 3/2012 | Hodge et al. |
| 2012/0070341 A1 | 3/2012 | Eder et al. |
| 2012/0071438 A1 | 3/2012 | Pedersen et al. |
| 2012/0115962 A1 | 5/2012 | Lee et al. |
| 2013/0266669 A1 | 10/2013 | Jiang et al. |
| 2013/0302736 A1 | 11/2013 | Utsumi et al. |
| 2014/0124454 A1 | 5/2014 | Nichols et al. |
| 2014/0224733 A1 | 8/2014 | Osness et al. |
| 2015/0203738 A1 | 7/2015 | Witham et al. |
| 2015/0272124 A1 | 10/2015 | Pedersen et al. |
| 2015/0290100 A1 | 10/2015 | Eder et al. |
| 2016/0010035 A1 | 1/2016 | Liu et al. |
| 2016/0030315 A1 | 2/2016 | Emiru et al. |
| 2016/0130494 A1 | 5/2016 | Zaid et al. |
| 2016/0145610 A1 | 5/2016 | Lu et al. |
| 2016/0215198 A1 | 7/2016 | Qu et al. |
| 2016/0262999 A1 | 9/2016 | Pedersen et al. |
| 2016/0264734 A1 | 9/2016 | Boday et al. |
| 2016/0264744 A1 | 9/2016 | Boday et al. |
| 2017/0002145 A1 | 1/2017 | Boday et al. |
| 2017/0029691 A1 | 2/2017 | Faust, Jr. et al. |
| 2017/0121560 A1 | 5/2017 | Dockery et al. |
| 2017/0130340 A1 | 5/2017 | Kalakodimi et al. |
| 2017/0233643 A1 | 8/2017 | Agashe et al. |
| 2017/0349543 A1 | 12/2017 | Siegwart et al. |
| 2017/0360040 A1 | 12/2017 | Kost et al. |
| 2018/0066211 A1 | 3/2018 | Pickering et al. |
| 2018/0105629 A1 | 4/2018 | Tada et al. |
| 2018/0118999 A1 | 5/2018 | Hikem et al. |
| 2018/0163020 A1 | 6/2018 | Zong et al. |
| 2018/0192643 A1 | 7/2018 | Fast et al. |
| 2019/0062187 A1 | 2/2019 | Dhawan et al. |
| 2019/0223434 A1 | 7/2019 | Balasubramanian et al. |
| 2020/0071205 A1 | 3/2020 | Dhawan et al. |
| 2020/0071261 A1 | 3/2020 | Dhawan et al. |
| 2020/0071265 A1 | 3/2020 | Dhawan et al. |
| 2020/0071602 A1 | 3/2020 | Dhawan et al. |
| 2020/0332423 A1 | 10/2020 | Dhawan et al. |

FOREIGN PATENT DOCUMENTS

| | | |
|---|---|---|
| CN | 1340031 A | 3/2002 |
| CN | 101972612 A | 2/2011 |
| CN | 102675535 A | 9/2012 |
| CN | 103118655 A | 5/2013 |
| CN | 103288672 A | 9/2013 |
| CN | 102675535 B | 11/2013 |
| CN | 104130335 A | 11/2014 |
| CN | 104130351 A | 11/2014 |
| CN | 104744709 A | 7/2015 |
| CN | 105076201 A | 11/2015 |
| CN | 105523956 A | 4/2016 |
| CN | 105884640 A | 8/2016 |
| CN | 106172434 A | 12/2016 |
| CN | 106423269 A | 2/2017 |
| CN | 106423284 A | 2/2017 |
| CN | 106634929 A | 5/2017 |
| CN | 106946743 A | 7/2017 |
| CN | 107440935 A | 12/2017 |
| CN | 108033895 A | 5/2018 |
| CN | 108048249 A | 5/2018 |
| CN | 108938662 A | 12/2018 |
| CN | 111315718 A | 6/2020 |
| DE | 1149363 B | 5/1963 |
| EP | 0185970 A1 | 2/1985 |
| EP | 0291590 A1 | 11/1988 |
| EP | 0296441 A2 | 12/1988 |
| EP | 0327379 A2 | 8/1989 |
| EP | 0900266 B1 | 10/2002 |
| EP | 1690960 A2 | 8/2006 |
| EP | 2333135 A1 | 6/2011 |
| GB | 847321 | 9/1960 |
| GB | 941752 | 11/1963 |
| GB | 1550420 A | 8/1979 |
| JP | 57185322 A | 11/1982 |
| JP | 6259602 A | 3/1987 |
| JP | 6116351 A | 4/1994 |
| JP | 6116898 A | 4/1994 |
| JP | 913066 A | 1/1997 |
| JP | 2001187751 A | 7/2001 |
| JP | 2007054710 A | 3/2007 |
| JP | 2007077082 A | 3/2007 |
| JP | 2007256445 A | 10/2007 |
| JP | 2012136504 A | 7/2012 |
| JP | 2014009177 A | 1/2014 |
| JP | 2014093768 A | 5/2014 |
| JP | 2014221859 A | 11/2014 |
| JP | 2015101552 A | 6/2015 |
| JP | 2017525798 A | 9/2017 |
| WO | 0039241 A1 | 7/2000 |
| WO | 03035797 A1 | 5/2003 |
| WO | 2004046211 A1 | 6/2004 |
| WO | 2004056843 A2 | 7/2004 |
| WO | 2006092736 A2 | 9/2006 |
| WO | 2008079729 A1 | 7/2008 |
| WO | 2009153209 A1 | 12/2009 |
| WO | 2012083497 A1 | 6/2012 |
| WO | 2013087287 A1 | 6/2013 |
| WO | 2014079621 A1 | 5/2014 |
| WO | 2015084304 A1 | 6/2015 |
| WO | 2016205513 A1 | 12/2016 |
| WO | 2017003639 A2 | 1/2017 |
| WO | 2017201076 A1 | 11/2017 |
| WO | 2018112548 A1 | 6/2018 |
| WO | 2019046409 A1 | 3/2019 |

OTHER PUBLICATIONS

Miller et al., "Non-viral CRISPR/Cas gene editing in vitro and in vivo enabled by synthetic nanoparticle co-delivery of Cas9 mRNA and sgRNA", Angew Chem Int Ed Engl., vol. 56(4), pp. 1059-1063, Jan. 19, 2017.

Ning et al., "Synthesis and characterization of a novel non-polyether demulsifier", Chemical Engineer, 3 pages, 2013.

Zielinski et al., "Synteza nowych czwartorzedowych soli amoniowych do organofilizacji nanokompozytowych napelniaczy polimerowych", www.miesiecznikchemik.pl, 2007.

Wang et al., "A novel environment-sensitive biodegradable polydisulfide with protonatable pendants for nucleic acid delivery", Journal of Controlled Release, vol. 120, pp. 250-258, May 11, 2007.

Ecolab USA Inc. in connection with PCT/US2019/048441 filed Aug. 28, 2019, "The International Search Report and the Written Opinion of the International Searching Authority, or the Declaration", 13 pages, dated Nov. 21, 2019.

Fan et al., "Synthesis and Aggregation Behavior of a Hexameric Quaternary Ammonium Surfactant", Langmuir, vol. 27, pp. 10570-10579, Jul. 28, 2011.

Zhang et al., "PAMAM-Based Dendrimers with Different Alkyl Chains Self-Assemble on Silica Surfaces: Controllable Layer Structure and Molecular Aggregation", J. Phys. Chem. B, vol. 122, pp. 6648-6655, Jun. 13, 2018.

Zhou et al., "Cooperative binding and self-assembling behavior of cationic low molecular-weight dendrons with RNA molecules", Organic & Biomolecular Chemistry, vol. 4, pp. 581-585, 2006.

Brycki et al., "The biodegradation of monomeric and dimeric alkylammonium surfactants", Journal of Hazardous Materials, vol. 280, pp. 797-815, Aug. 6, 2014.

(56) References Cited

OTHER PUBLICATIONS

Gan et al., "Sugar-Based Ester Quaternary Ammonium Compounds and Their Surfactant Properties", Journal of Surfactants and Detergents, vol. 17, Issue 3, pp. 465-470, Jan. 3, 2014.
Negm et al., "Synthesis, Characterization and Biological Activity of Sugar-Based Gemini Cationic Amphiphiles", Journal of Surfactants and Detergents, vol. 11, Issue 3, pp. 215-221, Apr. 26, 2008.
Tan et al., "The use of quaternised chitosan-loaded PMMA to inhibit biofilm formation and downregulate the virulence-associated gene expression of antibiotic-resistant *Staphylococcus*", Biomaterials, vol. 33, Issue 2, pp. 365-377, Jan. 2012.
Zaky, Mohamad, "Biocidal Activities of Cationic Surface Active Starch and Its Transition Metal Complexes Against Different Bacterial Strains", Journal of Surfactants and Detergents, vol. 13, Issue 3, pp. 255-260, Jul. 2010.
Zhi et al., "Self-aggregation and antimicrobial activity of saccharide-cationic surfactants", Colloids and Surfaces A: Physicochemical and Engineering Aspects, vol. 456, pp. 231-237, Aug. 2014.
"Azamethonium", http://pubchem.ncbi.nlm.nih.gov/compound/9383, last modified Oct. 6, 2018 and accessed by Applicant Oct. 11, 2018.
International Preliminary Examining Authority in connection with PCT/US2019/048441 filed Aug. 28, 2019, "Written Opinion of the International Preliminary Examining Authority", 7 pages, dated Jul. 15, 2020.
Labade et al., "Cesium fluoride catalyzed Aza-Michael addition reaction in aqueous media", Monatsh Chem., vol. 142, pp. 1055-1059, Jul. 19, 2011.
Somerscales, Euan F.C., "Fundamentals of Corrosion Fouling", Experimental Thermal and Fluid Science, vol. 14, pp. 335-355, 1997.
Zhang et al., "Controllable Self-Assembly of Amphiphilic Dendrimers on a Silica Surface: The Effect of Molecular Topological Structure and Salinity", Journal of Physical Chemistry, vol. 8, pp. 10990-10999, Oct. 5, 2016.
Zhang et al., "Supporting Information", Beijing National Laboratory for Molecular Sciences, published with "Controllable Self-Assembly of Amphiphilic Dendrimers on a Silica Surface: Effect of Molecular Topological Structure and Salinity", 4 pages Oct. 5, 2016.
Bosica et al., "Aza-Michael Mono-addition Using Acidic Alumina under Solventless Conditions", Molecules, vol. 21, 11 pages, Jun. 22, 2016.
Mann et al., "Acetal initiated cyclization of allylsilanes to highly functionalized piperidine derivatives", Tetraedron Letters, vol. 29(26), pp. 3247-3250, 1988.
Registry 790647-93-7, accessed online on Aug. 14, 2021, 1 page, registered Nov. 30, 2004.
Registry 881538-24-5, accessed online on Aug. 14, 2021, 1 page, registered Apr. 21, 2006.
Registry 881538-25-6, accessed online on Aug. 14, 2021, 1 page, registered Apr. 21, 2006.
Registry 881538-26-7, accessed online on Aug. 14, 2021, 1 page, registered Apr. 21, 2006.
Registry 930395-29-2, accessed online on Aug. 14, 2021, 1 page, registered Apr. 17, 2007.
Registry 951236-20-7, accessed online on Aug. 14, 2021, 1 page, registered Oct. 23, 2007.
Registry 951236-22-9, accessed online on Aug. 14, 2021, 1 page, registered Oct. 23, 2007.
Registry 951236-51-4, accessed online on Aug. 14, 2021, 1 page, registered Oct. 23, 2007.
Registry 1025555-14-9, accessed online on Aug. 14, 2021, 1 page, registered Jun. 5, 2008.
Registry 1025555-15-0, accessed online on Aug. 14, 2021, 1 page, registered Jun. 5, 2008.
Registry 1346596-75-5, accessed online on Aug. 14, 2021, 1 page, registered Nov. 30, 2011.
Registry 1346596-76-6, accessed online on Aug. 14, 2021, 1 page, registered Nov. 30, 2011.
Registry 1346596-77-7, accessed online on Aug. 14, 2021, 1 page, registered Nov. 30, 2011.
Registry 1801234-01-4, accessed online on Aug. 14, 2021, 1 page, registered Aug. 3, 2015.
Registry 1801234-02-5, accessed online on Aug. 14, 2021, 1 page, registered Aug. 3, 2015.
Registry 2000293-27-4, accessed online on Aug. 14, 2021, 1 page, registered Sep. 26, 2016.
Registry 2001056-21-7, accessed online on Aug. 14, 2021, 1 page, registered Sep. 27, 2016.
Twyman, Lance J., "Post synthetic modification of the hydrophobic interior of a water-soluble dendrimer", Tetrahedron Letters, vol. 41(35), pp. 6875-6878, 2000.

\* cited by examiner

Step-1

Step-2

USE OF MULTIPLE CHARGED CATIONIC COMPOUNDS DERIVED FROM PRIMARY AMINES OR POLYAMINES FOR MICROBIAL FOULING CONTROL IN A WATER SYSTEM

CROSS-REFERENCE TO RELATED APPLICATIONS

This is a continuation application of U.S. Ser. No. 16/554,435, filed Aug. 28, 2019, which claims priority under 35 U.S.C. § 119 to provisional application Ser. No. 62/724,391, filed Aug. 29, 2018, herein incorporated by reference in its entirety.

This application also relates to U.S. application. Ser. No. 16/554,415, which claims priority under 35 U.S.C. § 119 to U.S. Provisional Application Ser. 62/724,357, filed on Aug. 29, 2018 and titled "MULTIPLE CHARGED IONIC COMPOUNDS DERIVED FROM POLYAMINES AND COMPOSITIONS THEREOF AND METHODS OF PREPARATION THEREOF" and U.S. application. Ser. No. 16/554,935, which claims priority under 35 U.S.C. § 119 to U.S. Provisional Application Ser. 62/724,398, filed on Aug. 29, 2018 and titled "MULTIPLE CHARGED IONIC COMPOUNDS DERIVED FROM POLYAMINES AND COMPOSITIONS THEREOF AND USE THEREOF AS REVERSE EMULSION BREAKERS IN OIL AND GAS OPERATIONS." The entire contents of these patent applications are hereby expressly incorporated herein by reference including, without limitation, the specification, claims, and abstract, as well as any figures, tables, or drawings thereof.

FIELD OF THE INVENTION

The present disclosure relates generally to the field of microbial fouling control in a water system, using one or more specific di-cationic or multiple charged cationic compounds. In particular, the present disclosure relates to using a fouling control composition comprising one or more di-cationic or multiple charged cationic compounds that are derived from primary amines or polyamines for microbial fouling control in a water system. These di-cationic or multiple charged cationic compounds are the products of an aza-Michael Addition reaction between a primary amine or polyamine and an α,β-unsaturated carbonyl compound containing at least one cationic group or the products of an aza-Michael Addition reaction between a polyamine and an α, β-unsaturated carbonyl compound containing at least one cationic group and a ring-opening reaction with an epoxide. The methods, fouling control compositions, and di-cationic or multiple charged cationic compounds disclosed herein are more effective preventing bacteria and biofilm growth in a water system than the methods, compositions, or compounds that are currently used in an industrial water system.

BACKGROUND OF THE INVENTION

A water system, including an industrial water system, serves many different purposes. Any water system, including its equipment and water, is prone to microbial contamination and fouling. Fouling or deposition of any organic or inorganic material can occur even in an industrial water system that is treated with the best water treatment programs currently available. If a water system is not periodically cleaned, then it will become heavily fouled.

Fouling occurs due to microbiological contamination and subsequently microbial and/or biofilm growth. Sources of microbial contamination in industrial water systems are numerous and may include, but are not limited to, air-borne contamination, water make-up, process leaks, and improperly cleaned equipment. Microorganisms causing fouling can establish their microbial communities on any wetable or semi-wetable surfaces of a water system. Evaporative cooling water systems are particularly prone to fouling.

Fouling has a negative impact on a water system, particularly an industrial water system. For example, severe mineral scale (inorganic material) would buildup on any water contact surfaces and any scale in turn provides an ideal environment for microorganism and/or biofilm growth. If fouling or biofilm growth is allowed to progress in a water system, the water system can suffer from decreased operational efficiency, premature equipment failure, and increased health-related risks associated with microbial fouling and/or biofilm growth.

Exopolymeric substances secreted by microorganism aid formation of biofilms as the microbial communities develop on surfaces. These biofilms are complex ecosystems that establish a means for concentrating nutrients and offer protection for microbial growth, so the biofilms can accelerate scale formation, corrosion, and other fouling processes. Not only do biofilms contribute to efficiency reduction of the water system, but they also provide an excellent environment for microbial proliferation and for generating dangerous *Legionella* bacteria. It is therefore important that biofilms and other fouling processes be reduced to the greatest extent possible to minimize the health-related risk associated with *Legionella* and other water-borne pathogens.

Various methods are developed to clean or to remove biofilms and microorganisms associated with the biofilms. While cleaning and removing biofilms are necessary, a better approach is to prevent or reduce fouling or biofilm formation or growth, so the need to clear or remove biofilms is reduced. Cleaning or removing biofilms usually requires operation interruption and introduction of other chemicals. One way to prevent or reduce fouling and/or biofilm formation or growth is to treat a water system with a fouling control agent or fouling control composition. For example, corrosion inhibitors and/or fouling control agents are often added into upstream oil and gas production fluids to protect carbon steel pipelines and infrastructure from corrosion and biofilm growth.

Quaternary ammonium compounds have been used for many years as corrosion inhibitors and fouling control agents. Quaternary ammonium compounds belong to an important subcategory of surfactants because they have unique properties. A main distinction between quaternary ammonium compounds from other surfactants is their unique structure. Quaternary ammonium compounds consist mainly of two moieties, a hydrophobic group, i.e., long alkyl group, and a quaternary ammonium salt group. The unique positive charge of the ammonium plays a key role, i.e., electrostatic interactions, between the surfactant and surface or different components of biofilms. However, the quaternary ammonium compounds used for such purpose are often bis quaternary species or species quaternized with benzyl chloride that are known to be very hazardous. In additional, governmental regulations exist to release any water containing single quaternary compounds into the environment.

Therefore, there is a continuing need for different or alternative quaternary ammonium compounds that are better and safer corrosion and fouling control agents.

Accordingly, it is an objective of the present disclosure to develop novel fouling control agents having improved fouling control properties.

It is a further objective of the disclosure to develop methods and fouling control compositions to make the fouling control in a water system more efficient and effective.

These and other objects, advantages and features of the present disclosure will become apparent from the following specification taken in conjunction with the claims set forth herein.

BRIEF SUMMARY OF THE INVENTION

Disclosed herein are the methods and compositions for microbial fouling control in a water system. More particularly, the disclosed methods and compositions for microbial fouling or biofilm control use one or more water soluble di-cationic or multiple charged cationic compounds derived from primary amines and polyamines.

The exemplary di-cationic or multiple charged cationic compounds disclosed herein have a superior performance than the conventional single quaternary ammonium compounds for preventing microbial or biofilm growth in water systems. The exemplary di-cationic or multiple charged cationic compounds disclosed herein also show improved performance when they are used as, or corrosion inhibition agent in a water system or in other applications. Therefore, the disclosed fouling control compositions or methods have an advantage of not only preventing microbial/biofilm growth but also serving other purposes, leading to overall reduction in chemical uses, cost, and operation complexity for a water system.

In one aspect, disclosed herein is a method of controlling microbial fouling in a water system, wherein the method comprises providing a fouling control composition into a water system to generate a treated water system, wherein the fouling control composition comprises a compound or its salt derived from an aza-Michael Addition Reaction between a primary amine or polyamine and an α, β-unsaturated carbonyl compound according to the following formula

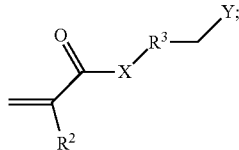

or
from an aza-Michael Addition Reaction between polyamine and an α,β-unsaturated carbonyl compound according to the following formula

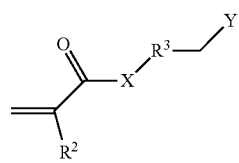

and a ring opening reaction from an epoxide according to the following formula

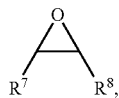

wherein X is NH or O; $R^2$ is H, $CH_3$, or an unsubstituted, linear or branched $C_2$-$C_{10}$ alkyl, alkenyl, or alkynyl group; $R^3$ is absent or an unsubstituted, linear or branched $C_1$-$C_{30}$ alkylene group; Y is —$NR_4R_5R_6^{(+)}$; $R^4$, $R^5$, and $R^6$ are independently a $C_1$-$C_{10}$ alkyl group; $R^7$ is H or alkyl; and $R^8$ is alkyl, or —$(CH_2)_k$—O-alkyl, wherein k is an integer of 1-30; wherein the compound is di-cationic compound having two

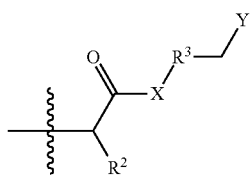

a multiple charged cationic compound having 1, 2, 3, or more

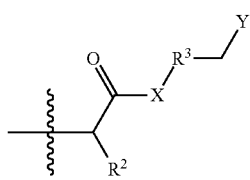

groups, or a multiple charged cationic compound having 1, 2, 3, or more

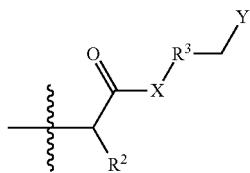

groups and at least one

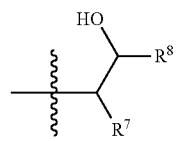

group

In another aspect, provided herein is a fouling control composition, wherein the composition comprises one or more additional fouling control agents and a compound or its salt derived from an aza-Michael Addition Reaction between a primary amine or polyamine and an α,β-unsaturated carbonyl compound according to the following formula

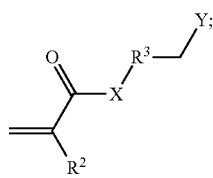

or from an aza-Michael Addition Reaction between a polyamine and an α,β-unsaturated carbonyl compound according to the following formula

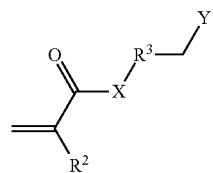

and a ring opening reaction from an epoxide according to the following formula

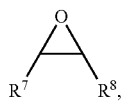

wherein X is NH or O; $R^2$ is H, $CH_3$, or an unsubstituted, linear or branched $C_2$-$C_{10}$ alkyl, alkenyl, or alkynyl group; $R^3$ is absent or an unsubstituted, linear or branched $C_1$-$C_{30}$ alkylene group; Y is $-NR_4R_5R_6^{(+)}$; $R^4$, $R^5$, and $R^6$ are independently a $C_1$-$C_{10}$ alkyl group; $R^7$ is H or alkyl; and $R^8$ is alkyl, or $-(CH_2)_k-O$-alkyl, wherein k is an integer of 1-30; wherein the compound is di-cationic having two

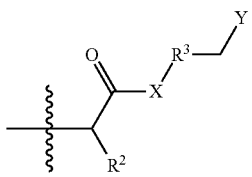

groups, a multiple charged cationic compound having 1, 2, 3, or more

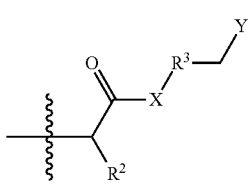

groups, or a multiple charged cationic compound having 1, 2, 3, or more

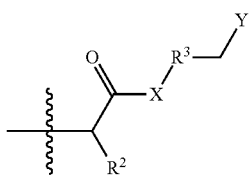

groups and at least one

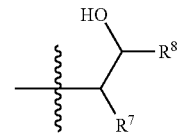

The forgoing summary is illustrative only and is not intended to be in any way limiting. In addition to the illustrative aspects, embodiments and features described above, further aspects, embodiments, and features of the present technology will become apparent to those skilled in the art from the following drawings and the detailed description, which shows and describes illustrative embodiments of the present technology. Accordingly, the figures and detailed description are also to be regarded as illustrative in nature and not in any way limiting.

Figure 1:
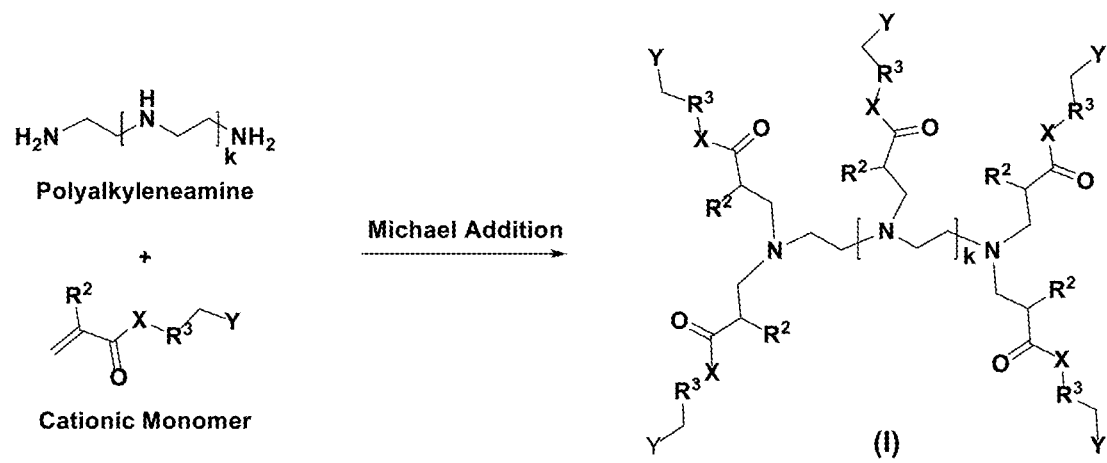
FIG. 1 shows a generic reaction scheme to produce a multiple charged cationic compound by an aza-Michael addition reaction between a linear polyamine and an α,β-unsaturated carbonyl compound.

Various embodiments of the present disclosure will be described in detail with reference to the drawings, wherein like reference numerals represent like parts throughout the several views. Reference to various embodiments does not limit the scope of the disclosure. Figures represented herein are not limitations to the various embodiments according to the disclosure and are presented for exemplary illustration of the disclosure.

DETAILED DESCRIPTION OF THE PREFERRED EMBODIMENT

In the following detailed description, reference may made to the accompanying drawings, schemes, and structures which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

Disclosed herein are methods and composition for fouling control in a water system. More particularly, one or more specific di-cationic or multiple charged cationic compounds are used in fouling control compositions or methods disclosed herein. These specific di-cationic or multiple charged cationic compounds are derived from primary amines or polyamines through an aza-Michael Addition reaction between a primary amine or polyamine and an α,β-unsaturated carbonyl compound, or through both an aza-Michael Addition reaction and ring-opening reaction among a polyamine, an α,β-unsaturated carbonyl compound and epoxide.

The embodiments of the present disclosure are not limited to any specific compositions and methods which can vary and are understood by skilled artisans. It is further to be understood that all terminology used herein is for describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this disclosure are presented in a range format. The description in range format is merely for convenience and brevity and should not be construed as an inflexible limitation on the scope of the disclosure. Accordingly, the description of a range should be considered to have specifically disclosed all the possible sub-ranges as well as individual numerical values within that range (i.e. 1 to 5 includes 1, 1.5, 2, 2.75, 3, 3.80, 4, and 5).

So that the present disclosure may be more readily understood, certain terms are first defined. Unless defined otherwise, all technical and scientific terms used herein have the same meaning as commonly understood by one of ordinary skill in the art to which embodiments of this disclosure pertain. Many methods and materials similar, modified, or equivalent to those described herein can be used in the practice of the embodiments of the present disclosure without undue experimentation, the preferred materials and methods are described herein. In describing and claiming the embodiments of the present disclosure, the following terminology will be used in accordance with the definitions set out below.

The term "about," as used herein, refers to variation in the numerical quantity that can occur, for example, through typical measuring and liquid handling procedures used for making concentrates or use solutions in the real world; through error in these procedures; through differences in the manufacture, source, or purity of the ingredients used to make the compositions or carry out the methods; and the like. The term "about" also encompasses amounts that differ due to novel equilibrium conditions for a composition resulting from a particular initial mixture. Whether or not modified by the term "about", the claims include equivalents to the quantities.

As used herein, "substituted" refers to an organic group as defined below (i.e., an alkyl group) in which one or more bonds to a hydrogen atom contained therein are replaced by a bond to non-hydrogen or non-carbon atoms. Substituted groups also include groups in which one or more bonds to carbon(s) or hydrogen(s) atom replaced by one or more bonds, including double or triple bonds, to a heteroatom. Thus, a substituted group is substituted with one or more substituents, unless otherwise specified. A substituted group can be substituted with 1, 2, 3, 4, 5, or 6 substituents.

Substituted ring groups include rings and ring systems in which a bond to a hydrogen atom is replaced with a bond to a carbon atom. Therefore, substituted cycloalkyl, aryl, heterocyclyl, and heteroaryl groups may also be substituted with substituted or unsubstituted alkyl, alkenyl, and alkynyl groups are defined herein.

As used herein, the term "alkyl" or "alkyl groups" refers to saturated hydrocarbons having one or more carbon atoms, including straight-chain alkyl groups (i.e., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (i.e., cyclopropyl, cyclopentyl, cyclohexyl, cycloheptyl, cyclooctyl, etc.), branched-chain alkyl groups (i.e., isopropyl, tert-butyl, sec-butyl, isobutyl, etc.), and alkyl-substituted alkyl groups (i.e., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

Alkenyl groups or alkenes are straight chain, branched, or cyclic alkyl groups having two to about 30 carbon atoms, and further including at least one double bond. In some embodiments, an alkenyl group has from 2 to about 30 carbon atoms, or typically, from 2 to 10 carbon atoms. Alkenyl groups may be substituted or unsubstituted. For a double bond in an alkenyl group, the configuration for the double bond can be a trans or cis configuration. Alkenyl groups may be substituted similarly to alkyl groups.

Alkynyl groups are straight chain, branched, or cyclic alkyl groups having two to about 30 carbon atoms, and further including at least one triple bond. In some embodiments, an alkynyl group has from 2 to about 30 carbon atoms, or typically, from 2 to 10 carbon atoms. Alkynyl groups may be substituted or unsubstituted. Alkynyl groups may be substituted similarly to alkyl or alkenyl groups.

As used herein, the terms "alkylene", "cycloalkylene", "alkynylides", and "alkenylene", alone or as part of another substituent, refer to a divalent radical derived from an alkyl, cycloalkyl, or alkenyl group, respectively, as exemplified by —CH$_2$CH$_2$CH$_2$—. For alkylene, cycloalkylene, alkynylene, and alkenylene groups, no orientation of the linking group is implied.

The term "ester" as used herein refers to —R$^{30}$COOR$^{31}$ group. R$^{30}$ is absent, a substituted or unsubstituted alkylene, cycloalkylene, alkenylene, alkynylene, arylene, aralkylene, heterocyclylalkylene, or heterocyclylene group as defined herein. R$^{31}$ is a substituted or unsubstituted alkyl, cycloalkyl, alkenyl, alkynyl, aryl, aralkyl, heterocyclylalkyl, or heterocyclyl group as defined herein.

The term "amine" (or "amino") as used herein refers to —R$^{32}$NR$^{33}$R$^{34}$ groups. R$^{32}$ is absent, a substituted or unsubstituted alkylene, cycloalkylene, alkenylene, alkynylene, arylene, aralkylene, heterocyclylalkylene, or heterocyclylene group as defined herein. R$^{33}$ and R$^{34}$ are independently hydrogen, or a substituted or unsubstituted alkyl, cycloalkyl, alkenyl, alkynyl, aryl, aralkyl, heterocyclylalkyl, or heterocyclyl group as defined herein.

The term "amine" as used herein also refers to an independent compound. When an amine is a compound, it can be represented by a formula of R$^{32'}$NR$^{33'}$R$^{34'}$ groups, wherein R$^{32'}$ R$^{33'}$, and R$^{34}$ are independently hydrogen, or a substituted or unsubstituted alkyl, cycloalkyl, alkenyl, alkynyl, aryl, aralkyl, heterocyclylalkyl, or heterocyclyl group as defined herein.

The term "alcohol" as used herein refers to —R$^{35}$OH groups. R$^{35}$ is absent, a substituted or unsubstituted alkylene, cycloalkylene, alkenylene, alkynylene, arylene, aralkylene, heterocyclylalkylene, or heterocyclylene group as defined herein.

The term "carboxylic acid" as used herein refers to —R$^{36}$COOH groups. R$^{36}$ is absent, a substituted or unsubstituted alkylene, cycloalkylene, alkenylene, alkynylene, arylene, aralkylene, heterocyclylalkylene, or heterocyclylene group as defined herein.

The term "ether" as used herein refers to —R$^{37}$OR$^{38}$ groups. R$^{37}$ is absent, a substituted or unsubstituted alkylene, cycloalkylene, alkenylene, alkynylene, arylene, aralkylene, heterocyclylalkylene, or heterocyclylene group as defined herein. R$^{38}$ is a substituted or unsubstituted alkyl, cycloalkyl, alkenyl, alkynyl, aryl, aralkyl, heterocyclylalkyl, or heterocyclyl group as defined herein.

The term "solvent" as used herein refers to any inorganic or organic solvent. Solvents are useful in the disclosed method or composition as reaction solvents or carrier solvents. Suitable solvents include, but are not limited to, oxygenated solvents such as lower alkanols, lower alkyl ethers, glycols, aryl glycol ethers and lower alkyl glycol ethers. Examples of other solvents include, but are not limited to, methanol, ethanol, propanol, isopropanol and butanol, isobutanol, ethylene glycol, diethylene glycol, triethylene glycol, propylene glycol, dipropylene glycol, glycol ethers, mixed ethylene-propylene glycol ethers, ethylene glycol phenyl ether, and propylene glycol phenyl ether. Water is a solvent too. The solvent used herein can be of a single solvent or a mixture of many different solvents.

Glycol ethers as used herein include, but are not limited to, diethylene glycol n-butyl ether, diethylene glycol n-propyl ether, diethylene glycol ethyl ether, diethylene glycol methyl ether, diethylene glycol t-butyl ether, dipropylene glycol n-butyl ether, dipropylene glycol methyl ether, dipropylene glycol ethyl ether, dipropylene glycol propyl ether, dipropylene glycol tert-butyl ether, ethylene glycol butyl ether, ethylene glycol propyl ether, ethylene glycol ethyl ether, ethylene glycol methyl ether, ethylene glycol methyl ether acetate, propylene glycol n-butyl ether, propylene glycol ethyl ether, propylene glycol methyl ether, propylene glycol n-propyl ether, tripropylene glycol methyl ether and tripropylene glycol n-butyl ether, ethylene glycol phenyl ether, propylene glycol phenyl ether, and the like, or mixtures thereof.

Acids

Generally, acids, as used in this disclosure, include both organic and inorganic acids. Organic acids include, but not limited to, hydroxyacetic (glycolic) acid, formic acid, acetic acid, propionic acid, butyric acid, valeric acid, caproic acid, gluconic acid, itaconic acid, trichloroacetic acid, urea hydrochloride, and benzoic acid. Organic acids also include dicarboxylic acids such as oxalic acid, malonic acid, succinic acid, glutaric acid, maleic acid, fumaric acid, adipic acid, and terephthalic acid. Combinations of these organic acids can also be used. Inorganic acids include, but are not limited to, mineral acids, such as phosphoric acid, sulfuric acid, sulfamic acid, methylsulfamic acid, hydrochloric acid, hydrobromic acid, hydrofluoric acid, and nitric acid. Inorganic acids can be used alone, in combination with other inorganic acid(s), or in combination with one or more organic acid. Acid generators can be used to form a suitable acid, including for example generators such as potassium fluoride, sodium fluoride, lithium fluoride, ammonium fluoride, ammonium bifluoride, sodium silicofluoride, etc.

Examples of particularly suitable acids in this the methods or compositions disclosed herein include inorganic and organic acids. Exemplary inorganic acids include phosphoric, phosphonic, sulfuric, sulfamic, methylsulfamic, hydrochloric, hydrobromic, hydrofluoric, and nitric. Exemplary organic acids include hydroxyacetic (glycolic), citric, lactic, formic, acetic, propionic, butyric, valeric, caproic, gluconic, itaconic, trichloroacetic, urea hydrochloride, and benzoic. Organic dicarboxylic acids can also be used such as oxalic, maleic, fumaric, adipic, and terephthalic acid.

Percarboxylic Acids and Peroxycarboxylic Acid Compositions

A peroxycarboxylic acid (i.e. peracid) or peroxycarboxylic acid composition can be included in the articles, products, or compositions disclosed herein. As used herein, the term "peracid" may also be referred to as a "percarboxylic acid," "peroxycarboxylic acid" or "peroxyacid." Sulfoperoxycarboxylic acids, sulfonated peracids and sulfonated peroxycarboxylic acids are also included within the terms "peroxycarboxylic acid" and "peracid" as used herein. As one of skill in the art appreciates, a peracid refers to an acid having the hydrogen of the hydroxyl group in carboxylic acid replaced by a hydroxy group. Oxidizing peracids may also be referred to herein as peroxycarboxylic acids.

A peracid includes any compound of the formula R—(COOOH)$_n$ in which R can be hydrogen, alkyl, alkenyl, alkyne, acylic, alicyclic group, aryl, heteroaryl, or heterocyclic group, and n is 1, 2, or 3, and named by prefixing the parent acid with peroxy. Preferably R includes hydrogen, alkyl, or alkenyl. The terms "alkyl," "alkenyl," "alkyne," "acylic," "alicyclic group," "aryl," "heteroaryl," and "heterocyclic group" are as defined herein.

A peroxycarboxylic acid composition, as used herein, refers to any composition that comprises one or more peracids, their corresponding acids, and hydrogen peroxide or or other oxidizing agents. A peroxycarboxylic acid composition can also include a stabilizer, fluorescent active tracer or compound, or other ingredients, as one skilled in the other would know.

As used herein, the terms "mixed" or "mixture" when used relating to "percarboxylic acid composition," "percarboxylic acids," "peroxycarboxylic acid composition" or "peroxycarboxylic acids" refer to a composition or mixture including more than one percarboxylic acid or peroxycarboxylic acid. Peracids such as peroxyacetic acid and peroxyoctanoic acid may also be used. Any combination of these acids may also be used.

In some embodiments, however, the articles, products, or compositions disclosed herein are free of a peroxycarboxylic acid or peroxycarboxylic acid composition.

Primary Amine and Polyamines

A primary amine has a generic formula of R$^{11}$NH$_2$, wherein R$^{11}$ is R$^1$ or R$^1$—Z—(CH$_2$)$_m$—; R$^1$ is an unsubstituted or substituted, linear or branched C$_1$-C$_{30}$ alkyl, cyclic alkyl, alkenyl, or alkynyl group; Z is NH or O; and m is an integer of 1 to 4.

A polyamine can have, but is limited to, a generic formula of NH$_2$—[R$^{10'}$]$_n$—NH$_2$, (RNH)$_n$—RNH$_2$, H$_2$N—(RNH)$_n$—RNH$_2$, or H$_2$N—(RN(R'))$_n$—RNH$_2$, wherein R$^{10'}$ is a linear or branched, unsubstituted or substituted C$_2$-C$_{10}$ alkylene group, or combination thereof; R is —CH$_2$—, —CH$_2$CH$_2$—, —CH$_2$CH$_2$CH$_2$—, —CH(CH$_3$)CH$_2$—, a linear or branched, unsubstituted or substituted C$_4$-C$_{10}$ alkylene group, or combination thereof; R' is —CH$_2$—, —CH$_2$CH$_2$—, —CH$_2$CH$_2$CH$_2$—, —CH(CH$_3$)CH$_2$—, a linear or branched, unsubstituted or substituted C$_4$-C$_{10}$ alkyl group, RNH$_2$, RNHRNH$_2$, or RN(RNH$_2$)$_2$; and n can be from 2 to 1,000,000. The monomer in a polyamine, e.g., the R or R' group, can be the same or different. In this disclosure, a polyamine refers to both small molecule polyamine when n is from 1 to 9 and polymeric polyamine when n is from 10 to 1,000,000.

Small molecule polyamines include, but are not limited to, ethylenediamine, diethylenetriamine, triethylenetetramine, tetraethylenepentamine, pentaethylenehexamine, hexaethyleneheptamine, and tris(2-aminoethyl)amine.

Other possible polyamines include JEFFAMINE® monoamines, diamines, and triamines by Huntsman. These highly versatile products contain primary amino groups attached to the end of a polyether backbone normally based on propylene oxide (PO), ethylene oxide (EO), or a mixture of both oxides. JEFFAMINE® amines include a polyetheramine family consisted of monoamines, diamines and triamines based on the core polyether backbone structure. JEFFAMINE® amines also include high-conversion, and polytetramethylene glycol (PTMEG) based polyetheramines. These JEFFAMINE® amines have an average molecular weight (M$_w$) of from about 130 to about 4,000.

A polyamine used in this disclosure can be a polyamine derivative or modified polyamine, in which one or more of the NH protons, but not all, in the polyamine is substituted by an unsubstituted or substituted group. For example, an alkyl polyamine that contains one or more alkyl group connected to the nitrogen atom can be used to produce the multiple charge cationic polyamine disclosed herein. In these PEI derivatives, only some of primary NH$_2$ or secondary NH protons are replaced by other non-proton groups and the remaining NH$_2$ or NH protons can still react with a Michael acceptor, such as an activated olefin containing a hydrophilic (ionic) group, by an aza-Michael Addition reaction and with an epoxide by a ring opening reaction.

One class of the polymeric polyamine includes polyethyleneimine (PEI) and its derivatives. Polyethyleneimine (PEI) or polyaziridine is a polymer with a repeating unit of CH$_2$CH$_2$NH and has a general formulation of NH$_2$(CH$_2$CH$_2$NH)$_n$—CH$_2$CH$_2$NH$_2$, wherein n can be from 2 to 10$^5$. The repeating monomer in PEI has a molecular weight (M$_w$) of 43.07 and a nitrogen to carbon ratio of 1:2.

PEI derivatives include ethoxylated/propylated PEIs, polyquats PEI, polyglycerol quats PEI, and other PEI derivatives, salts, or mixtures thereof. The molar mass of the polyethyleneimines, including modified polyethyleneimines can vary from about 800 g/mol to about 2,000,000 g/mol. For Example, SOKALAN® HP20 is an alkoxylated PEI product. In these PEI derivatives, only some of primary NH$_2$ or secondary NH protons are replaced by functional groups and the remaining NH$_2$ or NH protons can still react with a Michael acceptor, e.g., activated olefin or α,β-unsaturated compound containing a hydrophilic (ionic) group.

PEIs and their derivatives can linear, branched, or dendric. Linear polyethyleneimines contain all secondary amines, in contrast to branched PEIs which contain primary, secondary and tertiary amino groups. Totally branched, dendrimeric forms also exist and contain primary and tertiary amino groups. Drawings for unmodified linear, branched, and dendrimeric PEI are shown below.

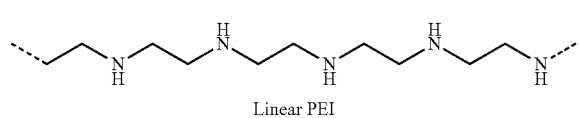

Linear PEI

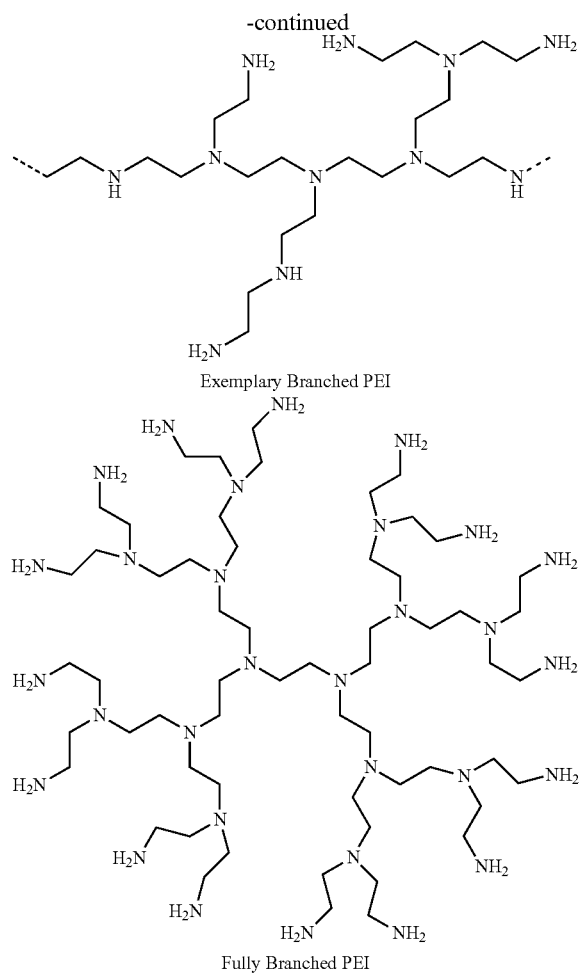

Exemplary Branched PEI

Fully Branched PEI

PEI derivatives are usually obtained by substituting proton(s) on the nitrogen atoms with different group. One such PEI derivative is ethoxylated and propoxylated PEI, wherein the polyethyleneimines are derivatized with ethylene oxide (EO) and/or propylene oxide (PO) side chains. Ethoxylation of PEIs can increase the solubility of PEIs.

PEI is produced on industrial scale. Various commercial polyethyleneimines are available, including for example those sold under the tradename Lupasol® (BASF), including for example Lupasol® FG, Lupasol® G, Lupasol® PR 8515, Lupasol® WF, Lupasol® G 20/35/100, Lupasol® HF, Lupasol® P, Lupasol® PS, Lupasol® PO 100, Lupasol® PN 50/60, and Lupasol® SK. These PEIs have average molecular weights ($M_w$) of about 800, about 1,300, about 2,000, about 5,000, about 25,000, about 1,300/2,000/5,000, about 25,000, about 750,000, about 750,000, about 1,000,000, and about 2,000,000, respectively.

Two common used averages for molecular weight of a polymer are number average molecular weight ($M_n$) and weight average molecular weight ($M_w$). The polydispersity index (D) represents the molecular weight distribution of the polymers. $Mn=(\Sigma n_i M_i)/\Sigma n_i$, $M_w=(\Sigma n_i M_i^2)/\Sigma n_i M_i$, and $D=M_w/M_n$, wherein the index number, i, represents the number of different molecular weights present in the sample and this the total number of moles with the molar mass of $M_i$. For a polymer, $M_n$ and $M_w$ are usually different. For example, a PEI compound can have a $M_n$ of about 10,000 by GPC and $M_w$ of about 25,000 by LS.

Light Scattering (LS) can be used to measure $M_w$ of a polymer sample. Another easy way to measure molecular weight of a sample or product is gel permeation chromatography (GPC). GPC is an analytical technique that separates molecules in polymers by size and provides the molecular weight distribution of a material. GPC is also sometimes known as size exclusion chromatography (SEC). This technique is often used for the analysis of polymers for their both $M_n$ and $M_w$.

These commercially available and exemplary polyethyleneimines are soluble in water and available as anhydrous polyethyleneimines and/or modified polyethyleneimines provided in aqueous solutions or methoxypropanol (as for Lupasol® PO 100).

PEI and its derivatives find many applications usually derived from its polycationic character. Because of the presence of amine groups, PEI can be protonated with acids to form a PEI salt from the surrounding medium resulting in a product that is partially or fully ionized depending on pH. For example, about 73% of PEI is protonated at pH 2, about 50% of PEI is protonated at pH 4, about 33% of PEI is protonated at pH 5, about 25% of PEI is protonated at pH 8 and about 4% of PEI is protonated at pH 10. In general, PEIs can be purchased as their protonated or unprotonated form with and without water. The commercial PEIs at pH 13 have a charge (cationic) density of about 16-17 meq/g (milliequivalents per gram).

The counterion of each protonated nitrogen center is balanced with an anion of an acid obtained during neutralization. Examples of protonated PEI salts include, but are not limited to, PEI-hydrochloride salt, PEI-sulfuric acid salt, PEI-nitric acid salt, PEI-acetic acid salt PEI fatty acid salt and the like. In fact, any acid can be used to protonate PEIs resulting in the formation of the corresponding PEI salt compound.

Suitable polyethyleneimine useful in the present disclosure may contain a mixture of primary, secondary, and tertiary amine substituents or mixture of different average molecular weights. The mixture of primary, secondary, and tertiary amine substituents may be in any ratio, including for example in the ratio of about 1:1:1 to about 1:2:1 with branching every 3 to 3.5 nitrogen atoms along a chain segment. Alternatively, suitable polyethyleneimine compounds may be primarily one of primary, secondary or tertiary amine substituents.

The polyamine that can be used to make the multiple charged cationic or anionic compounds disclosed herein can have a wide range of its average molecular weight. Different multiple charged cationic or anionic compounds with their characteristic average molecular weights can be produced by selecting different starting small molecule polyamines, polymeric PEIs, or mixture thereof. Controlling the size of polyamines or PEI and extent of modification by the α,β-unsaturated compound and epoxide, one can produce the multiple charged cationic or anionic compounds with a similar average molecular weight and multiple cationic charges or multiple anionic charges. Because of this character, one can produce and use different multiple charged cationic or anionic compounds for a wider range of applications that are using unmodified polyamine or PEIs.

Specifically, the polyamines that can be used to make the multiple charged cationic compounds disclosed here have an average molecular weight ($M_w$) of about 60-200, about 100-400, about 100-600, about 600-5,000, about 600-800, about 800-2,000, about 800-5,000, about 100-2,000,000, about 100-25,000, about 600-25,000, about 800-25,000, about 600-750,000, about 800-750,000, about 25,000-750, 000, about 750,000-2,000,000, about 100, about 200, about 300, about 400, about 500, about 600, about 700, about 800, about 1,000, about 1,500, about 2,000, about 3,000, about 5,000, about 8,000, about 10,000, about 15,000, about 20,000, about 50,000, about 100,000, about 250,000, about 500,000, about 1,000,000, about 2,000,000, or any value there between.

Aza-Michael Addition Reaction and Ring Opening Reaction

The di-cationic or multiple charged cationic compounds disclosed as fouling control agents herein are derived from an aza-Michael Addition Reaction between a primary amine or polyamine and an α,β-unsaturated carbonyl compound containing a hydrophilic cationic group or from an aza-Michael Addition Reaction between a polyamine and an α,β-unsaturated carbonyl compound containing a hydrophilic cationic group and a ring opening reaction between the polyamine and an epoxide.

An aliphatic amine group may undergo an aza-Michael Addition reaction when in contact with an unsaturated hydrocarbon moiety (e.g., carbon-carbon double bond) that is in proximity of an electron withdrawing group such as carbonyl, cyano, or nitro group. Specifically, the Michael addition is a reaction between nucleophiles and activated olefin and alkyne functionalities, wherein the nucleophile adds across a carbon-carbon multiple bond that is adjacent to an electron withdrawing and resonance stabilizing activating group, such as a carbonyl group. The Michael addition nucleophile is known as the "Michael donor", the activated electrophilic olefin is known as the "Michael acceptor", and reaction product of the two components is known as the "Michael adduct." Examples of Michael donors include, but are not restricted to, amines, thiols, phosphines, carbanions, and alkoxides. Examples of Michael acceptors include, but are not restricted to, acrylate esters, alkyl methacrylates, acrylonitrile, acrylamides, maleimides, cyanoacrylates and vinyl sulfones, vinyl ketones, nitro ethylenes, α,β-unsaturated aldehydes, vinyl phosphonates, acrylonitrile, vinyl pyridines, azo compounds, beta-keto acetylenes and acetylene esters.

As used herein, an "activated olefin" refers to a substituted alkene in which at least one of the double-bond carbon has a conjugated electron withdrawing group. Examples of activated olefins include, but not limited to, α,β-unsaturated carbonyl compounds (such as $CH_2=CHCO—NH—CH_3$, alkyl-$CH=CH—CO$-alkyl, $CH_2=CH_2C(O)—O—CH_3$), $CH_2=CH—COOH$, $CH_2=CH(CH_3)—COOH$, $CH_2=CH—SO_3H$, and like.

Aza-Michael addition reaction can be catalyzed by a strong acid or base. In some cases, some ionic liquids can function both as reaction media and catalyst. The preferred catalyst for the Aza-Michael addition reaction to synthesize the disclosed compounds is a base. Exemplary base catalyst can be hydroxide and amines. Because the reaction to synthesize the disclosed compounds uses a polyamine that usually include a primary amine group, the primary amine group itself can function as a catalyst for the reaction. In such embodiments, no additional catalyst is necessary, or an additional catalyst is optional. Other preferred catalysts include amidine and guanidine bases.

The use of solvent and/or diluent for the reaction is optional. When employed, a wide range of non-acidic solvents are suitable, such as, for example, water, ethers (e.g., tetrahydrofuran (THF)), aromatic hydrocarbons (e.g., toluene and xylene), alcohols (e.g., n-butanol), esters (e.g., ethyl 3-ethoxypropionate), and the like. A wide range of solvents can be used for the reaction because the synthesis process is relatively insensitive to solvent. When solvent (or diluent) is employed, loading levels can range from as low as about 10 wt-% up to about 80 wt-% and higher. The solvent loading level can be about 0 wt-%, from about 1 wt-% to about 10 wt-%, from about 10 wt-% to about 20 wt-%, from about 20 wt-% to about 30 wt-%, from about 30 wt-% to about 40 wt-%, from about 40 wt-% to about 50 wt-%, from about 50 wt-% to about 60 wt-%, from about 60 wt-% to about 70 wt-%, from about 70 wt-% to about 80 wt-%, from about 1 wt-% to about 20 wt-%, from about 20 wt-% to about 40 wt-%, from about 40 wt-% to about 60 wt-%, from about 60 wt-% to about 80 wt-%, from about 40 wt-% to about 70 wt-%, at least about 5 wt-%, about 15 wt-%, about 25 wt-%, about 35 wt-%, about 45 wt-%, about 55 wt-%, about 65 wt-%, about 75 wt-%, or any value there between of the final reaction mixture.

Generally, the reaction can be carried out at a temperature over a wide range of temperatures. The reaction temperature can range from about 0° C. to about 150° C., more preferably from about 50° C. to about 80° C. The temperature for contacting the polyamine and activated olefin can be from about 10° C. to about 140° C., about 20° C. to about 130° C., about 30° C. to about 120° C., about 40° C. to about 110° C., about 50° C. to about 100° C., about 60° C. to about 90° C., about 70° C. to about 80° C., about 0° C. to about 20° C., about 20° C. to about 40° C., about 40° C. to about 60° C., about 60° C. to about 80° C., about 80° C. to about 100° C., about 100° C. to about 120° C., about 120° C. to about 150° C., about 5° C., about 25° C., about 45° C., about 65° C., about 85° C., about 105° C., about 125° C., about 145° C., or any value there between. The reaction temperature can be about the same from starting of the reaction to end of the reaction or can be changed from one temperature to another while the reaction is going on.

The reaction time for the synthesis of the compounds disclosed herein can vary widely, depending on such factors as the reaction temperature, the efficacy and amount of the catalyst, the presence or absence of diluent (solvent), and the like. The preferred reaction time can be from about 0.5 hours to about 48 hours, from about 1 hour to about 40 hours, from about 2 hours to about 38 hours, from about 4 hours to about 36 hours, from 6 hours to about 34 hours, from about 8 hours to about 32 hours, from about 10 hours to about 30 hours, from about 12 hours to about 28 hours, from about 14 hours to 26 hours, from about 16 hours to 24 hours, from about 18 hours to 20 hours, from about 1 hour to 8 hours, from 8 hours to 16 hours, from 8 hours to about 24 hours, about 2 hours, about 4 hours, about 6 hours, about 8 hours, about 10 hours, about 14 hours, about 16 hours, about 18 hours, about 24 hours, about 30 hours, about 36 hours, or any values there between.

The reaction for the synthesis of the compounds disclosed herein can go to completion when one mole of the polyamine and two or more moles of the activated olefin are mixed together for a sufficient of time at a temperature described above.

The progression of the reaction can be typically monitored by ESI-MS and/or NMR spectroscopy for consumption of the monomer. The reaction products can be purified or separated by HPLC or other methods known by one skilled in the art. For reactions that proceeded to completion, the formed product can be separated by removal of solvent or by precipitation in a non-polar solvent that was the opposite of the reaction media. For the reactions in water, the formed product is precipitated from the aqueous reaction mixture. Higher pressure can speed-up the reaction. In some embodiments, if the reaction is carried out at a room temperature, the reaction can have a product yield of more than 98%, in some embodiments within about 16 hours.

The ring opening reaction between a polyamine and epoxide can be carried out in a similar way as the aza Michael Addition reaction between the polyamine and the α,β-unsaturated carbonyl compounds.

This ring opening reaction can be done at a temperature of from about −20° C. to about 200° C. and in the presence of a catalyst, base, or acid. In some embodiments, the ring opening reaction is done free of a catalyst, base, or acid. In some other embodiments, the ring opening reaction is at a temperature from about 100° C. to about 150° C.; a different temperature for the aza Michael Addition reaction; in the presence of a different catalyst, base, or acid.

Both aza Michael addition and ring opening reactions for synthesis of the compounds disclosed can be accomplished when one mole of the polyamine and specified moles (two or more moles) of the activated olefin, the epoxide, and the both, are mixed together for a sufficient of time at a temperature described above.

It was found that the Aza-Michael addition and ring opening reaction of an epoxide can be used to synthesize the disclosed compounds without having to use a higher temperature greater than 200° C. and high pressure greater than normal atmosphere pressure and with a high yield (greater than 98%).

Other Fouling Control Composition Agent in a Fouling Control Composition

In addition to the di-cationic or multiple charged cationic compounds derived from a primary amines or polyamine as described herein, a fouling control composition in the present disclosure includes one or more additional fouling control composition agents.

The additional fouling control composition agent in the disclosed fouling control compositions can include, but is not limited to, an acid, carrier, dispersant, biocide, corrosion inhibitor, antioxidant, polymer degradation prevention agent, permeability modifier, foaming agent, antifoaming agent, fracturing proppant, scavenger for $H_2S$, $CO_2$, and/or $O_2$, gelling agent, lubricant, and friction reducing agent, salt, or mixtures thereof.

The additional fouling control composition agent in the disclosed fouling control compositions can also include, but not be limited to, an organic sulfur compound, asphaltene inhibitor, paraffin inhibitor, scale inhibitor, water clarifier, emulsion breaker, reverse emulsion breaker, gas hydrate inhibitor, a pH modifier, a surfactant, or a combination thereof.

Furthermore, the additional fouling control composition agent can be a sequestrant, solubilizer, lubricant, buffer, cleaning agent, rinse aid, preservative, binder, thickener or other viscosity modifier, processing aid, carrier, water-conditioning agent, or foam generator, threshold agent or system, aesthetic enhancing agent (i.e., dye, odorant, perfume), or other additive suitable for formulation with a reverse emulsion breaker, or mixtures thereof.

The additional fouling control composition agent in a fouling control composition disclosed herein will vary according to the specific fouling control composition being manufactured and its intend use as one skilled in the art will appreciate.

Alternatively, the fouling control composition does not contain or is free of one or more of the additional fouling control agents.

When one or more additional fouling control agents are used for preventing microbial or biofilm growth, they can be formulated together with the di-cationic or multiple charge cationic compounds derived from a primary or polyamine as described here in the same fouling control composition. Alternatively, some or all the additional fouling control agents can be formulated into one or more different formulations and be supplied to the water system. In other words, the additional fouling control agents can be provided into a water system independently, simultaneously, or sequentially.

Biocide and Carrier

In some embodiments, the fouling control compositions disclosed herein further include a biocide. In some other embodiments, the disclosed fouling control compositions herein further include a carrier. In some other embodiments, the disclosed fouling control compositions herein further include a biocide and carrier. In some embodiments, the disclosed methods or fouling control compositions herein may consist of one or more di-cationic or multiple charged cationic compounds disclosed herein and carrier. In some embodiments, the fouling control compositions disclosed herein consist of one or more di-cationic or multiple charged cationic compounds disclosed herein, a carrier, and biocide.

Biocides suitable for use may be oxidizing or non-oxidizing biocides. Oxidizing biocides include, but are not limited to, bleach, chlorine, bromine, chlorine dioxide, and materials capable of releasing chlorine and bromine. Non-oxidizing biocides include, but are not limited to, glutaraldehyde, isothiazolin, 2,2-dibromo-3-nitrilopropionamide, 2-bromo-2-nitropropane-1,3 diol, 1-bromo-1-(bromomethyl)-1,3-propanedicarbonitrile, tetrachloroisophthalonitrile, alkyldimethylbenzylammonium chloride, dimethyl dialkyl ammonium chloride, didecyl dimethyl ammonium chloride, poly(oxyethylene(dimethyliminio)ethylene(dimethyliminio)ethylene dichloride, methylene bisthiocyanate, 2-decylthioethanamine, tetrakishydroxymethyl phosphonium sulfate, dithiocarbamate, cyanodithioimidocarbonate, 2-methyl-5-nitroimidazole-1-ethanol, 2-(2-bromo-2-nitroethenyl)furan, beta-bromo-beta-nitrostyrene, beta-nitrostyrene, beta-nitrovinyl furan, 2-bromo-2-bromomethyl glutaronitrile, bis(trichloromethyl) sulfone, S-(2-hydroxypropyl)thiomethanesulfonate, tetrahydro-3,5-dimethyl-2H-1,3,5-hydrazine-2-thione, 2-(thiocyanomethylthio)benzothiazole, 2-bromo-4'-hydroxyacetophenone, 1,4-bis(bromoacetoxy)-2-butene, bis(tributyltin)oxide, 2-(tert-butylamino)-4-chloro-6-(ethylamino)-s-triazine, dodecylguanidine acetate, dodecylguanidine hydrochloride, coco alkyldimethylamine oxide, n-coco alkyltrimethylenediamine, tetra-alkyl phosphonium chloride, 7-oxabicyclo[2.2.1]heptane-2,3-dicarboxylic acid, 4,5-dichloro-2-n-octyl-4-isothiazoline-3-one, 5-chloro-2-methyl-4-isothiazolin-3-one and 2-methyl-4-isothiazolin-3-one.

Suitable non-oxidizing biocides also include, for example, aldehydes (i.e., formaldehyde, glutaraldehyde, and acrolein), amine-type compounds (i.e., quaternary amine compounds and cocodiamine), halogenated compounds (i.e., 2-bromo-2-nitropropane-3-diol (Bronopol) and 2-2-dibromo-3-nitrilopropionamide (DBNPA)), sulfur compounds (i.e., isothiazolone, carbamates, and metronidazole), and quaternary phosphonium salts (i.e., tetrakis(hydroxymethyl)-phosphonium sulfate (THPS)).

Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, peroxycarboxylic acid, peroxycarboxylic acid composition, and peroxides.

The composition can comprise from about 0.1 to about 10 wt-%, from about 0.5 to about 5 wt-%, or from about 0.5 to about 4 wt-% of a biocide, based on total weight of the composition.

A carrier in the disclosed fouling control composition can be water, an organic solvent, or a combination of water and an organic solvent. The organic solvent can be an alcohol, a hydrocarbon, a ketone, an ether, an alkylene glycol, a glycol ether, an amide, a nitrile, a sulfoxide, an ester, or a combination thereof. Examples of suitable organic solvents include, but are not limited to, methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphta, cyclohexanone, diisobutylketone, diethyl ether, propylene carbonate, N-methylpyrrolidinone, N,N-dimethylformamide, or a combination thereof.

The fouling control composition can comprise from about 1 wt-% to about 80 wt-%, from about 1 wt-% to about 70 wt-%, from about 1 wt-% to about 60 wt-%, from about 1 wt-% to about 50 wt-%, from about 1 wt-% to about 40 wt-%, from about 1 wt-% to about 30 wt-%, from about 1 wt-% to about 20 wt-%, from about 1 wt-% to about 10 wt-%, from about 5 wt-% to about 10 wt-%, from about 5 wt-% to about 20 wt-%, from about 5 wt-% to about 30 wt-%, from about 5 wt-% to about 40 wt-%, from about 5 wt-% to about 50 wt-%, from about 10 wt-% to about 20 wt-%, from about 10 wt-% to about 30 wt-%, from about 10 wt-% to about 40 wt-%, from about 10 wt-% to about 50 wt-%, about 10 wt-%, about 20 wt-%, about 30 wt-%, about 40-%, about 50 wt-%, about 60 wt-%, about 70 wt-%, about 90 wt-%, or any value there between of the one or more carrier, based on total weight of the composition.

Corrosion Inhibitor

In some embodiments, the fouling control compositions disclosed herein further include a corrosion inhibitor. In some other embodiments, the disclosed fouling control compositions herein further include a corrosion inhibitor and carrier. In some other embodiments, the disclosed fouling control compositions herein further include a corrosion inhibitor, biocide, and carrier. In some embodiments, the disclosed fouling control compositions herein may consist of one or more di-cationic or multiple charged cationic compounds disclosed herein, one or more corrosion inhibitors and carrier. In some embodiments, the fouling control compositions disclosed herein consist of one or more di-cationic or multiple charged cationic compounds disclosed herein, a carrier, corrosion inhibitor, and a biocide.

The fouling control composition can comprise from about 0.1 to 20 wt-%, 0.1 to 10 wt-%, or 0.1 to 5 wt-% of the one or more corrosion inhibitors, based on total weight of the composition. A composition disclosed herein can comprise from 0 to 10 percent by weight of the one or more corrosion inhibitors, based on total weight of the composition. The composition can comprise 1.0 wt-%, 1.5 wt-%, 2.0 wt-%, 2.5 wt-%, 3.0 wt-%, 3.5 wt-%, 4.0 wt-%, 4.5 wt-%, 5.0 wt-%, 5.5 wt-%, 6.0 wt-%, 6.5 wt-%, 7.0 wt-%, 7.5 wt-%, 8.0 wt-%, 8.5 wt-%, 9.0 wt-%, 9.5 wt-%, 10.0 wt-%, 10.5 wt-%, 11.0 wt-%, 11.5 wt-%, 12.0 wt-%, 12.5 wt-%, 13.0 wt-%, 13.5 wt-%, 14.0 wt-%, 14.5 wt-%, or 15.0 wt-% by weight of the one or more corrosion inhibitors, based on total weight of the composition. Each water system can have its own requirements for using a corrosion inhibitor, and the weight percent of one or more corrosion inhibitors in the composition can vary with the water system in which it is used.

A corrosion inhibitor is needed to reduce corrosion of metals in the water system. Corrosion inhibitors for multi-metal protection are typically triazoles, such as, but not limited to, benzotriazole, halogenated triazoles, and nitro-substituted azoles.

The one or more corrosion inhibitors can be an imidazoline compound, a quaternary ammonium compound, a pyridinium compound, or a combination thereof.

The one or more corrosion inhibitors can be an imidazoline. The imidazoline can be, for example, imidazoline derived from a diamine, such as ethylene diamine (EDA), diethylene triamine (DETA), triethylene tetraamine (TETA) etc. and a long chain fatty acid such as tall oil fatty acid (TOFA). The imidazoline can be an imidazoline of Formula (1A) or an imidazoline derivative. Representative imidazoline derivatives include an imidazolinium compound of Formula (2A) or a bis-quaternized compound of Formula (3A).

The one or more corrosion inhibitors can include an imidazoline of Formula (1A):

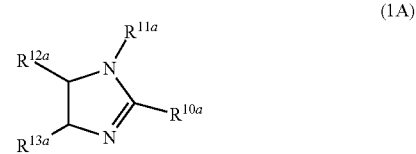

(1A)

wherein $R^{10a}$ is a $C_1$-$C_{20}$ alkyl or a $C_1$-$C_{20}$ alkoxyalkyl group; $R^{11a}$ is hydrogen, $C_1$-$C_6$ alkyl, $C_1$-$C_6$ hydroxyalkyl, or $C_1$-$C_6$ arylalkyl; and $R^{12a}$ and $R^{13a}$ are independently hydrogen or a $C_1$-$C_6$ alkyl group. Preferably, the imidazoline includes an $R^{10a}$ which is the alkyl mixture typical in tall oil fatty acid (TOFA), and $R^{11a}$, $R^{12a}$ and $R^{13a}$ are each hydrogen.

The one or more additional corrosion inhibitors can be an imidazolinium compound of Formula (2A):

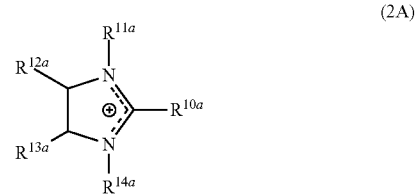

(2A)

wherein $R^{10a}$ a is a $C_1$-$C_{20}$ alkyl or a $C_1$-$C_{20}$ alkoxyalkyl group; $R^{11a}$ and $R^{14a}$ are independently hydrogen, $C_1$-$C_6$ alkyl, $C_1$-$C_6$ hydroxyalkyl, or $C_1$-$C_6$ arylalkyl; $R^{12a}$ and $R^{13a}$ are independently hydrogen or a $C_1$-$C_6$ alkyl group; and $X^-$ is a halide (such as chloride, bromide, or iodide), carbonate, sulfonate, phosphate, or the anion of an organic carboxylic acid (such as acetate). Preferably, the imidazolinium compound includes 1-benzyl-1-(2-hydroxyethyl)-2-tall-oil-2-imidazolinium chloride.

The one or more additional corrosion inhibitors can be a bis-quaternized compound having the formula (3A):

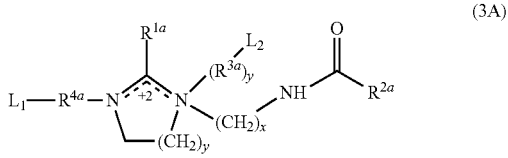

(3A)

wherein $R^{1a}$ and $R^{2a}$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof; $R^{1a}$ and $R^{4a}$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof; $L_1$ and $L_2$ are each independently absent, H, —COOH, —SO$_3$H, —PO$_3$H$_2$, —COOR$^{5a}$, —CONH$_2$, —CONHR$^{5a}$, or —CON(R$^{5a}$)$_2$; $R^{5a}$ is each independently a branched or unbranched alkyl, aryl, alkylaryl, alkylheteroaryl, cycloalkyl, or heteroaryl group having from 1 to about 10 carbon atoms; n is 0 or 1, and when n is 0, $L_2$ is absent or H; x is from 1 to about 10; and y is from 1 to about 5. Preferably, $R^{1a}$ and $R^{2a}$ are each independently $C_6$-$C_{22}$ alkyl, $C_8$-$C_{20}$ alkyl, $C_{12}$-$C_{18}$ alkyl, $C_{16}$-$C_{18}$ alkyl, or a combination thereof; $R^{1a}$ and $R^{4a}$ are $C_1$-$C_{10}$ alkylene, $C_2$-$C_8$ alkylene, $C_2$-$C_6$ alkylene, or $C_2$-$C_3$ alkylene; n is 0 or 1; $R_3$ and $R_4$ are —C$_2$H$_2$—; $L_1$ is —COOH, —SO$_3$H, or —PO$_3$H$_2$; and $L_2$ is absent, H, —COOH, —SO$_3$H, or —PO$_3$H$_2$. For example, $R^{1a}$ and $R^{2a}$ can be derived from a mixture of tall oil fatty acids and are predominantly a mixture of $C_{17}H_{33}$ and $C_{17}H_{31}$ or can be $C_{16}$-$C_{18}$ alkyl; $R^{1a}$ and $R^{4a}$ can be $C_2$-$C_3$ alkylene such as —C$_2$H$_2$—; n is 1 and $L_2$ is —COOH or n is 0 and $L_2$ is absent or H; x is 2; y is 1; $R^{1a}$ and $R^{4a}$ are —C$_2$H$_2$—; and $L_1$ is —COOH.

It should be appreciated that the number of carbon atoms specified for each group of formula (3A) refers to the main chain of carbon atoms and does not include carbon atoms that may be contributed by substituents.

The one or more corrosion inhibitors can be a bis-quaternized imidazoline compound having the formula (3A) wherein $R^{1a}$ and $R^{2a}$ are each independently $C_6$-$C_{22}$ alkyl, $C_8$-$C_{20}$ alkyl, $C_{12}$-$C_{18}$ alkyl, or $C_{16}$-$C_{18}$ alkyl or a combination thereof; $R^{4a}$ is $C_1$-$C_{10}$ alkylene, $C_2$-$C_8$ alkylene, $C_2$-$C_6$ alkylene, or $C_2$-$C_3$ alkylene; x is 2; y is 1; n is 0; $L_1$ is —COOH, —SO$_3$H, or —PO$_3$H$_2$; and $L_2$ is absent or H. Preferably, a bis-quaternized compound has the formula (3A) wherein $R^{1a}$ and $R^{2a}$ are each independently $C_{16}$-$C_{18}$ alkyl; $R^{4a}$ is —C$_2$H$_2$—; x is 2; y is 1; n is 0; $L_1$ is —COOH, —SO$_3$H, or —PO$_3$H$_2$ and $L_2$ is absent or H.

The one or more corrosion inhibitors can be a quaternary ammonium compound of Formula (4A):

(4A)

wherein $R^{1a}$, $R^{2a}$, and $R^{1a}$ are independently $C_1$ to $C_{20}$ alkyl, $R^{4a}$ is methyl or benzyl, and X$^-$ is a halide or methosulfate.

Suitable alkyl, hydroxyalkyl, alkylaryl, arylalkyl or aryl amine quaternary salts include those alkylaryl, arylalkyl and aryl amine quaternary salts of the formula [N$^+$R$^{5a}$R$^{6a}$R$^{7a}$R$^{8a}$][X$^-$] wherein R$^{5a}$, R$^{6a}$, R$^{7a}$, and R$^{8a}$ contain one to 18 carbon atoms, and X is Cl, Br or I. For the quaternary salts, R$^{5a}$, R$^{6a}$, R$^{7a}$, and R$^{8a}$ can each be independently alkyl (i.e., $C_1$-$C_{18}$ alkyl), hydroxyalkyl (i.e., $C_1$-$C_{18}$ hydroxyalkyl), and arylalkyl (i.e., benzyl). The mono or polycyclic aromatic amine salt with an alkyl or alkylaryl halide include salts of the formula [N$^+$R$^{5a}$R$^{6a}$R$^{7a}$R$^{8a}$][X$^-$] wherein R$^{5a}$, R$^{6a}$, R$^{7a}$ and R$^{8a}$ contain one to 18 carbon atoms and at least one aryl group, and X is Cl, Br or I.

Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, wherein the alkyl group has about 6 to about 24 carbon atoms, about 10 and about 18 carbon atoms, or about 12 to about 16 carbon atoms. The quaternary ammonium salt can be a benzyl trialkyl quaternary ammonium salt, a benzyl triethanolamine quaternary ammonium salt, or a benzyl dimethylaminoethanolamine quaternary ammonium salt.

The one or more corrosion inhibitors can be a pyridinium salt such as those represented by Formula (5A):

(5A)

wherein $R^{9a}$ is an alkyl group, an aryl group, or an arylalkyl group, wherein said alkyl groups have from 1 to about 18 carbon atoms and X$^-$ is a halide such as chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium chloride and an alkyl benzyl pyridinium chloride, preferably wherein the alkyl is a $C_1$-$C_6$ hydrocarbyl group. Preferably, the pyridinium compound includes benzyl pyridinium chloride.

The one or more additional corrosion inhibitors can be a phosphate ester, monomeric or oligomeric fatty acid, alkoxylated amine, or mixture thereof.

The one or more corrosion inhibitors can be a phosphate ester. Suitable mono-, di- and tri-alkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethylphosphate producing a broader distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The one or more corrosion inhibitors can be a monomeric or oligomeric fatty acid. Preferred monomeric or oligomeric fatty acids are $C_{14}$-$C_{22}$ saturated and unsaturated fatty acids as well as dimer, trimer and oligomer products obtained by polymerizing one or more of such fatty acids.

The one or more corrosion inhibitors can be an alkoxylated amine. The alkoxylated amine can be an ethoxylated alkyl amine. The alkoxylated amine can be ethoxylated tallow amine.

Dispersant

In some embodiments, the fouling control compositions disclosed herein can further comprise a dispersant. A dispersant keeps particulate matter present in the water of a water system dispersed, so that it does not agglomerate. The composition can comprise from about 0.1 to about 10 wt-%, from about 0.5 to about 5 wt-%, or from about 0.5 to about 4 wt-% of a dispersant, based on total weight of the composition.

A dispersant may be an acrylic acid polymer, maleic acid polymer, copolymer of acrylic acid with sulfonated monomers, alkyl esters thereof, or combination thereof. These polymers may include terpolymers of acrylic acid, acrylamide and sulfonated monomers. These polymers may also include quad-polymers consisting of acrylic acid and three other monomers.

Suitable dispersants include, but are not limited to, aliphatic phosphonic acids with 2-50 carbons, such as hydroxyethyl diphosphonic acid, and aminoalkyl phosphonic acids, i.e. polyaminomethylene phosphonates with 2-10 N atoms i.e. each bearing at least one methylene phosphonic acid group; examples of the latter are ethylenediamine tetra(methylene phosphonate), diethylenetriamine penta(methylene phosphonate), and the triamine- and tetraminepolymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

The fouling control composition can further comprise an organic sulfur compound, such as a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof. Preferably, the mercaptoalkyl alcohol comprises 2-mercaptoethanol. Such compounds are used as synergists in the composition. The organic sulfur compound can constitute about 0.5 wt-% to about 15 wt-% of the composition, based on total weight of the composition, preferably about 1 wt-% to about 10 wt-% and more preferably about 1 wt-% to about 5 wt-%. The organic sulfur compound can constitute about 1 wt-%, about 2 wt-%, about 3 wt-%, about 4 wt-%, about 5 wt-%, about 6 wt-%, about 7 wt-%, about 8 wt-%, about 9 wt-%, about 10 wt-%, about 11 wt-%, about 12 wt-%, about 13 wt-%, about 14 wt-%, or about 15 wt-% of the composition.

The fouling control composition can further comprise a de-emulsifier. Preferably, the demulsifier comprises an oxyalkylate polymer, such as a polyalkylene glycol. The de-emulsifier can constitute from about 0.1 wt-% to about 10 wt-%, from about 0.5 wt-% to about 5 wt. %, or from about 0.5 wt-% to about 4 wt-% of the composition, based on total weight of the composition. The de-emulsifier can constitute about 0.5 wt-%, about 1 wt-%, about 1.5 wt-%, about 2 wt-%, about 2.5 wt-%, about 3 wt-%, about 3.5 wt-%, about 4 wt-%, about 4.5 wt-%, or about 5 wt-% of the composition.

The fouling control composition can further comprise an asphaltene inhibitor. The composition can comprise from about 0.1 to about 10 wt-%, from about 0.1 to about 5 wt-%, or from about 0.5 to about 4 wt-% of an asphaltene inhibitor, based on total weight of the composition. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

The fouling control composition can further comprise a paraffin inhibitor. The composition can comprise from about 0.1 wt-% to about 10 wt-%, from about 0.1 wt-% to about 5 wt-%, or from about 0.5 wt-% to about 4 wt-% of a paraffin inhibitor, based on total weight of the composition. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable paraffin dispersants include, but are not limited to, dodecyl benzene sulfonate, oxyalkylated alkylphenols, and oxyalkylated alkylphenolic resins.

The fouling control composition can further comprise a scale inhibitor. The composition can comprise from about 0.1 wt-% to about 20 wt-%, from about 0.5 wt-% to about 10 wt-%, or from about 1 wt-% to about 10 wt-% of a scale inhibitor, based on total weight of the composition. Suitable scale inhibitors include, but are not limited to, phosphates, phosphate esters, phosphoric acids, phosphonates, phosphonic acids, polyacrylamides, salts of acrylamidomethyl propane sulfonate/acrylic acid copolymer (AMPS/AA), phosphinated maleic copolymer (PHOS/MA), mono-, bis- and oligomeric phosphinosuccinic acid (PSO) derivatives, polycarboxylic acid, hydrophobically modified polycarboxylic acid, and salts of a polymaleic acid/acrylic acid/acrylamidomethyl propane sulfonate terpolymer (PMA/AA/AMPS).

The fouling control composition can further comprise an emulsifier. The composition can comprise from about 0.1 wt-% to about 10 wt-%, from about 0.5 wt-% to about 5 wt-%, or from about 0.5 wt-% to about 4 wt-% of an emulsifier, based on total weight of the composition. Suitable emulsifiers include, but are not limited to, salts of carboxylic acids, products of acylation reactions between carboxylic acids or carboxylic anhydrides and amines, and alkyl, acyl and amide derivatives of saccharides (alkylsaccharide emulsifiers).

The fouling control composition can further comprise a water clarifier. The composition can comprise from about 0.1 wt-% to about 10 wt-%, from about 0.5 wt-% to about 5 wt-%, or from about 0.5 wt-% to about 4 wt-% of a water clarifier, based on total weight of the composition. Suitable water clarifiers include, but are not limited to, inorganic metal salts such as alum, aluminum chloride, and aluminum chlorohydrate, or organic polymers such as acrylic acid-based polymers, acrylamide-based polymers, polymerized amines, alkanolamines, thiocarbamates, and cationic polymers such as diallyldimethylammonium chloride (DADMAC).

The fouling control composition can further comprise an emulsion breaker. The composition can comprise from about 0.1 wt-% to about 10 wt-%, from about 0.5 wt-% to about 5 wt-%, or from about 0.5 wt-% to about 4 wt-% of an emulsion breaker, based on total weight of the composition. Suitable emulsion breakers include, but are not limited to, dodecylbenzylsulfonic acid (DDBSA), the sodium salt of xylenesulfonic acid (NAXSA), epoxylated and propoxylated compounds, and resins, such as phenolic and epoxide resins.

The fouling control composition can further comprise a hydrogen sulfide scavenger. The composition can comprise from about 1 wt-% to about 50 wt-%, from about 1 wt-% to about 40 wt-%, or from about 1 wt-% to about 30 wt-% of a hydrogen sulfide scavenger, based on total weight of the composition. Suitable additional hydrogen sulfide scavengers include, but are not limited to, oxidants (i.e., inorganic peroxides such as sodium peroxide or chlorine dioxide); aldehydes (i.e., of 1-10 carbons such as formaldehyde, glyoxal, glutaraldehyde, acrolein, or methacrolein; triazines (i.e., monoethanolamine triazine, monomethylamine triazine, and triazines from multiple amines or mixtures thereof); condensation products of secondary or tertiary amines and aldehydes, and condensation products of alkyl alcohols and aldehydes.

The fouling control composition can further comprise a gas hydrate inhibitor. The composition can comprise from about 0.1 wt-% to about 25 wt-%, from about 0.5 wt-% to about 20 wt-%, or from about 1 wt-% to about 10 wt-% of a gas hydrate inhibitor, based on total weight of the composition. Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (i.e. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (i.e. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

The fouling control composition can further comprise a kinetic hydrate inhibitor. The composition can comprise from about 0.1 wt-% to about 25 wt-%, from about 0.5 wt-% to about 20 wt-%, or from about 1 wt-% to about 10 wt-% of a kinetic hydrate inhibitor, based on total weight of the composition. Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines, hydrocarbon based dispersants (such as lignosulfonates, iminodisuccinates, polyaspartates), amino acids, and proteins.

The fouling control composition can further comprise a pH modifier. The composition can comprise from about 0.1 wt-% to about 20 wt-%, from about 0.5 wt-% to about 10 wt-%, or from about 0.5 wt-% to about 5 wt-% of a pH modifier, based on total weight of the composition. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

The fouling control composition can further comprise a surfactant. The composition can comprise from about 0.1 wt-% to about 10 wt-%, from about 0.5 wt-% to about 5 wt-%, or from about 0.5 wt-% to about 4 wt-% of a surfactant, based on total weight of the composition. A suitable surfactant can be a nonionic, cationic, anionic, amphoteric, zwitterionic, gemini, dicationic, dianionic surfactant, or mixtures thereof. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis (2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropionates and amphodipropionates, and alkyliminodipropionate.

The fouling control composition can further comprise additional fouling control agents that provide a functional and/or beneficial property. For example, additional fouling control composition agents can be a sequestrant, solubilizer, lubricant, buffer, cleaning agent, rinse aid, preservative, binder, thickener or other viscosity modifier, processing aid, water-conditioning agent, foam inhibitor or foam generator, threshold agent or system, aesthetic enhancing agent (i.e., dye, odorant, perfume), or other agents suitable for formulation with the fouling control composition, and mixtures thereof. Additional agents or additives will vary according to the specific fouling control composition being manufactured and its intend use as one skilled in the art will appreciate.

Alternatively, the fouling control composition does not contain or is free of any of the additional fouling control composition agents.

Additionally, the fouling control composition can be formulated into compositions comprising the following components as shown in Tables 1A-1B. These formulations include the ranges of the components listed and can optionally include additional agents. The values in the Tables 1A-1B below are weight percentages.

TABLE 1A

Exemplary Fouling Control Compositions

| Component | 1 | 2 | 3 | 4 | 5 | 6 | 7 | 8 | 9 | 10 | 11 | 12 |
|---|---|---|---|---|---|---|---|---|---|---|---|---|
| Di-cationic or multiple charged cationic compounds | 0.1-20 | 0.1-20 | 0.1-20 | 0.1-20 | 0.1-20 | 0.1-20 | 10-20 | 10-20 | 10-20 | 10-20 | 10-20 | 0.1-20 |
| Surfactant | 5-40 | — | 5-50 | — | 5-50 | 5-50 | 5-40 | — | 5-50 | — | — | 10-20 |
| corrosion inhibitor | 0.1-20 | 0.1-20 | — | — | — | — | 0.1-20 | 0.1-20 | — | — | — | 0.1-20 |
| preservative | 0.1-5 | 0.1-5 | 0.1-5 | 0.1-5 | — | — | 0.1-5 | 0.1-5 | 0.1-5 | — | — | 0.1-5 |
| Scale inhibitor | 1-10 | 1-10 | 1-10 | 1-10 | 1-10 | — | 1-10 | 1-10 | 1-10 | 1-10 | — | 1-10 |
| Water Clarifier | — | — | — | — | — | — | — | — | — | — | — | 0.1-25 |
| Biocide | 0.5-5 | 0.5-5 | 0.5-5 | 0.5-5 | 0.5-5 | 0.5-5 | 0.5-5 | 0.5-5 | 0.5-5 | 0.5-5 | 0.5-5 | — |
| Water | 0.00 | 0-40 | 0-10 | 0-60 | 0-15 | 0-25 | 0.00 | 0-40 | 0-10 | 0-65 | 0-75 | — |

TABLE 1B

Exemplary Fouling Control Compositions

| Component | 13 | 14 | 15 | 16 | 17 | 18 | 19 | 20 | 21 | 22 | 23 | 24 |
|---|---|---|---|---|---|---|---|---|---|---|---|---|
| Di-cationic or multiple charged cationic compounds | 0.1-20 | 0.1-20 | 0.1-20 | 0.1-20 | 0.1-20 | 0.1-20 | 10-20 | 10-20 | 10-20 | 10-20 | 10-20 | 10-20 |
| Surfactant | — | 10-20 | — | 10-35 | 10-35 | — | 10-15 | — | — | 10-35 | 10-35 | — |
| Corrosion inhibitor | 0.1-20 | 0.1-20 | 0.1-20 | 0.1-20 | 0.1-20 | 0.1-20 | 0.1-20 | 0.1-20 | 0.1-20 | 0.1-20 | 0.1-20 | 0.1-20 |
| Preservative | 0.1-5 | — | — | — | — | — | 0.1-5 | — | — | — | — | — |
| Scale inhibitor | 1-10 | 1-10 | — | — | 1-10 | — | 1-10 | 1-10 | 1-10 | — | — | 1-10 |
| Water Clarifier | 0.1-25 | 0.1-25 | 0.1-25 | — | — | — | 0.1-25 | 0.1-25 | 0.1-25 | — | 0.1-25 | — |
| Biocide | — | — | — | — | — | 0.5-5 | 0.5-5 | 0.5-5 | 0.5-5 | 0.5-5 | — | — |
| Water | 0-20 | 0-5 | 0-35 | 0-25 | 0-15 | 0-55 | 0.00 | 0-20 | 0-30 | 0-20 | 0.00 | 0-50 |

Water System

The fouling control composition or its use solution is applied to a water system to prevent microbial or biofilm growth in the water system or on the surfaces within the water system. In some embodiments, the water system in the disclosed methods herein is an industrial water system. In other embodiments, the water system can be, but is not limited to, a cooling water system, including an open recirculating system, closed and once-through cooling water system, boilers and boiler water system, petroleum well system, downhole formation, geothermal well, and other water system in oil and gas field applications, a mineral washing system, flotation and benefaction system, paper mill digester, washer, bleach plant, stock chest, white water system, paper machine surface, black liquor evaporator in the pulp industry, gas scrubber and air washer, continuous casting processes in the metallurgical industry, air conditioning and refrigeration system, industrial and petroleum process water, indirect contact cooling and heating water, water reclamation system, water purification system, membrane filtration water system, food processing stream (meat, vegetable, sugar beets, sugar cane, grain, poultry, fruit and soybean), waste treatment system, clarifier, liquid-solid application, municipal sewage treatment, municipal water system, potable water system, aquifer, water tank, sprinkler system, or water heater.

In some embodiments, the water system is a cooling water system, including open recirculating, closed and once-through cooling water system, paper machine surface, food processing stream, waste treatment system, or potable water system.

In some embodiments, the water system is any system including a wetable surface. Examples of such water systems include, but are not limited to, walls and floors of bath rooms, surfaces of foods and vegetables, and processing fluid for food. Such surfaces are typically in constant contact with water or water moisture and subjected to biofilm growth.

Use of the Methods or Compositions Disclosed

In some embodiments, for the methods disclosed herein, providing a fouling control composition into a water system means that the fouling control composition, di-cationic or multiple charged cationic compounds, or use solution thereof is added into a fluid comprising water or a surface of a water system. In other embodiments, providing a fouling control composition into a water system means adding the fouling control composition, di-cationic or multiple charged cationic compounds, or use solution thereof to the water or surfaces of the water system. In some other embodiments, providing a fouling control composition into a water system means adding the fouling control composition or the di-cationic or multiple charged cationic compounds to a fluid or gas which contacts the surfaces of the water system. The fouling control composition, di-cationic or multiple charged cationic compounds, or use solution may be added continuously, or intermittently when more compounds or compositions may be needed.

A use solution of a fouling control composition or one or more di-cationic or multiple charged cationic compounds as used herein refers to a diluted solution for the composition or compounds by a diluent. A diluent as used herein refers to water, the water of the water system, or one of the carriers or solvents defined herein. The fouling control composition or the compounds can be diluted by a factor of 0.5, 1, 2, 3, 4, 5, 6, 7, 8, 9, 10, 11-1,000,000, or any value there between to generate a use solution and then provide the use solution to a water system or onto a surface. In this disclosure, when a composition or di-cationic or multiple charged cationic compounds are applied, either the composition/compounds or use solution thereof is applied.

In some embodiments, the fouling control composition or the di-cationic or multiple charged cationic compounds disclosed herein may be added to the water of the water system, so the concentration of the composition or compounds in the treated water system is in an amount ranging from about 0.001 ppm to about 5000 ppm. In other embodiments, the amount of the fouling control composition or the di-cationic or multiple charged cationic compounds in the water of the water system may range from about 0.001 ppm to about 4000 ppm, from about 0.001 ppm to about 3000 ppm, from about 0.001 ppm to about 2000 ppm, from about 0.001 ppm to about 1000 ppm, from about 0.001 ppm to about 100 ppm, from about 0.01 ppm to about 100 ppm, from about 0.1 ppm to about 100 ppm, from about 1 ppm to about 100 ppm, 5 ppm to about 100 ppm, about 5 ppm to about 50 ppm, about 5 ppm to about 40 ppm, about 5 ppm to about 30 ppm, about 10 ppm to about 60 ppm, about 10 ppm to about 50 ppm, about 10 ppm to about 40 ppm, about 10 ppm to about 30 ppm, about 20 ppm to about 60 ppm, about 20 ppm to about 50 ppm, about 20 ppm to about 40 ppm, or about 20 ppm to about 30 ppm. In some embodiments, the fouling control composition or the di-cationic or multiple charged cationic compounds may be added to the water to an amount ranging from about 0.001 ppm to about 5000 ppm, from about 0.001 ppm to about 4000 ppm, from about 0.001 ppm to about 3000 ppm, from about 0.001 ppm to about 2000 ppm, from about 0.001 ppm to about 1000 ppm, about 1 ppm to about 1000 ppm, about 125 ppm to about 1000 ppm, about 250 ppm to about 1000 ppm, or about 500 ppm to about 1000 ppm.

The fouling control composition or the di-cationic or multiple charged cationic compounds can be used for fouling control in oil and gas applications such as by treating a gas or liquid stream with an effective amount of the compound or composition as described herein. The compounds and compositions can be used in any industry where it is desirable to prevent microbial or biofilm growth at a surface.

The fouling control composition or the di-cationic or multiple charged cationic compounds can be used in a condensate/oil systems/gas system, or any combination thereof. For example, the fouling control composition or the di-cationic or multiple charged cationic compounds can be used in fouling control on heat exchanger surfaces. The fouling control composition or the di-cationic or multiple charged cationic compounds can be applied to a gas or liquid produced, or used in the production, transportation, storage, and/or separation of crude oil or natural gas. The fouling control composition or the di-cationic or multiple charged cationic compounds can be applied to a gas stream used or produced in a coal-fired process, such as a coal-fired power plant.

The fouling control composition or the di-cationic or multiple charged cationic compounds can be applied to a gas or liquid produced or used in a waste-water process, a farm, a slaughter house, a land-fill, a municipality waste-water plant, a coking coal process, or a biofuel process.

A fluid to which the fouling control composition or the di-cationic or multiple charged cationic compounds can be introduced can be an aqueous medium. The aqueous medium can comprise water, gas, and optionally liquid hydrocarbon.

A fluid to which the fouling control composition or the di-cationic or multiple charged cationic compounds can be introduced can be a liquid hydrocarbon. The liquid hydrocarbon can be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene. The fluid or gas can be a refined hydrocarbon product.

A fluid or gas treated with the fouling control composition or the di-cationic or multiple charged cationic compounds can be at any selected temperature, such as ambient temperature or an elevated temperature. The fluid (i.e., liquid hydrocarbon) or gas can be at a temperature of from about 40° C. to about 250° C. The fluid or gas can be at a temperature of from −50° C. to 300° C., 0° C. to 200° C., 10° C. to 100° C., or 20° C. to 90° C. The fluid or gas can be at a temperature of 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., or 40° C. The fluid or gas can be at a temperature of 85° C., 86° C., 87° C., 88° C., 89° C., 90° C., 91° C., 92° C., 93° C., 94° C., 95° C., 96° C., 97° C., 98° C., 99° C., or 100° C.

The fouling control composition or the di-cationic or multiple charged cationic compounds can be added to a fluid (or water system) at various levels of water cut. For example, the water cut can be from 0% to 100% volume/volume (v/v), from 1% to 80% v/v, or from 1% to 60% v/v. The fluid can be an aqueous medium that contains various levels of salinity. The fluid can have a salinity of 0% to 25%, about 1% to 24%, or about 10% to 25% weight/weight (w/w) total dissolved solids (TDS).

The fluid or gas, i.e., a water system, in which the fouling control composition or the di-cationic or multiple charged cationic compounds are introduced can be contained in and/or exposed to many types of apparatuses. For example, the fluid or gas can be contained in an apparatus that transports fluid or gas from one point to another, such as an oil and/or gas pipeline. The apparatus can be part of an oil and/or gas refinery, such as a pipeline, a separation vessel, a dehydration unit, or a gas line. The fluid can be contained in and/or exposed to an apparatus used in oil extraction and/or production, such as a wellhead. The apparatus can be part of a coal-fired power plant. The apparatus can be a scrubber (i.e., a wet flue gas desulfurizer, a spray dry absorber, a dry sorbent injector, a spray tower, a contact or bubble tower, or the like). The apparatus can be a cargo vessel, a storage vessel, a holding tank, or a pipeline connecting the tanks, vessels, or processing units.

The fouling control composition or the di-cationic or multiple charged cationic compounds can be introduced into a fluid or gas of the water system by any appropriate method for ensuring dispersal through the fluid or gas. For examples, the fouling control composition or the di-cationic or multiple charged cationic compounds can be added to the hydrocarbon fluid before the hydrocarbon fluid contacts the surface.

The fouling control composition or the di-cationic or multiple charged cationic compounds can be added at a point in a flow line upstream from the point at which fouling control is desired. The fouling control composition or the di-cationic or multiple charged cationic compounds can be injected using mechanical equipment such as chemical injection pumps, piping tees, injection fittings, atomizers, quills, and the like.

The fouling control composition or the di-cationic or multiple charged cationic compounds can be pumped into an oil and/or gas pipeline using an umbilical line. A capillary injection system can be used to deliver the fouling control composition or the di-cationic or multiple charged cationic compounds to a selected fluid.

A fluid to which the fouling control composition or the di-cationic or multiple charged cationic compounds can be introduced can be an aqueous medium. The aqueous medium can comprise water, gas, and optionally liquid hydrocarbon. A fluid to which the fouling control composition or the di-cationic or multiple charged cationic compounds can be introduced can be a liquid hydrocarbon.

The fouling control composition or the di-cationic or multiple charged cationic compounds can be introduced into a liquid and a mixture of several liquids, a liquid and gas, liquid, solid, and gas. The fouling control composition or the di-cationic or multiple charged cationic compounds can be injected into a gas stream as an aqueous or non-aqueous solution, mixture, or slurry.

The fluid or gas can be passed through an absorption tower comprising the fouling control composition or the di-cationic or multiple charged cationic compounds.

The fouling control composition or the di-cationic or multiple charged cationic compounds can be applied to a fluid or gas to provide any selected concentration. In practice, the fouling control composition or the di-cationic or multiple charged cationic compounds are typically added to a flow line to provide an effective treating dose of the fouling control composition or the di-cationic or multiple charged cationic compounds from about 0.01 ppm to about 5,000 ppm. The fouling control composition or the di-cationic or multiple charged cationic compounds can be applied to a fluid or gas to provide an active concentration of about 1 parts per million (ppm) to about 1,000,000 ppm, about 1 parts per million (ppm) to about 100,000 ppm, or about 10 ppm to about 75,000 ppm. The polymer salts/compositions can be applied to a fluid to provide an actives concentration of about 100 ppm to about 10,000 ppm, about 200 ppm to about 8,000 ppm, or about 500 ppm to about 6,000 ppm. The actives concentration means the concentration of fouling control composition or the di-cationic or multiple charged cationic compounds.

The fouling control composition or the di-cationic or multiple charged cationic compounds can be applied to a fluid or gas to provide an active concentration of 0.1 ppm, 0.5 ppm, 1 ppm, 2 ppm, 5 ppm, 10 ppm, 20 ppm, 100 ppm, 200 ppm, 500 ppm, or 1,000 ppm in the treated fluid or gas, i.e., the treated water system. The fouling control composition or the di-cationic or multiple charged cationic compounds can be applied to a fluid or gas or water system to provide an actives concentration of 0.125 ppm, 0.25 ppm, 0.625 ppm, 1 ppm, 1.25 ppm, 2.5 ppm, 5 ppm, 10 ppm, or 20 ppm in the treated fluid, gas, or water system. Each water system can have its own dose level requirements, and the effective dose level of the fouling control composition or the di-cationic or multiple charged cationic compounds to sufficiently reduce the rate of microbial or biofilm growth can vary with the water system in which it is used.

The fouling control composition or the di-cationic or multiple charged cationic compounds can be applied continuously, in batch, or a combination thereof. The fouling control composition or the di-cationic or multiple charged cationic compounds dosing can be continuous. The fouling control composition or the di-cationic or multiple charged cationic compounds dosing can be intermittent (i.e., batch treatment) or can be continuous/maintained and/or intermittent.

Dosage rates for continuous treatments typically range from about 1 to about 500 ppm, or about 1 to about 200 ppm. Dosage rates for batch treatments typically range from about 10 to about 400,000 ppm, or about 10 to about 20,000 ppm. The fouling control composition or the di-cationic or multiple charged cationic compounds can be applied as a pill to a pipeline, providing a high dose (i.e., 20,000 ppm) of the composition.

The flow rate of a flow line in which the fouling control composition or the di-cationic or multiple charged cationic compounds is used can be between 0.1 and 100 feet per second, or between 0.1 and 50 feet per second. The fouling control composition or the di-cationic or multiple charged cationic compounds can also be formulated with water in order to facilitate addition to the flow line.

A surface of a water system can be any surface that can make contact to the water or vapor of the water of the water system in any way. The surface can be a part of a wellbore or equipment used in the production, transportation, storage, and/or separation of a fluid such as crude oil or natural gas.

More specifically, the surface can be a part of equipment used a coal-fired process, a waste-water process, a farm, a slaughter house, a land-fill, a municipality waste-water plant, a coking coal process, or a biofuel process. Preferably, the surface can be a part of equipment used in the production of crude oil or natural gas.

The equipment can comprise a pipeline, a storage vessel, downhole injection tubing, a flow line, or an injection line.

The fouling control composition or the di-cationic or multiple charged cationic compounds are useful for preventing microbial or biofilm growth of containers, processing facilities, or equipment in the food service or food processing industries. The fouling control composition or the di-cationic or multiple charged cationic compounds have particular value for use on food packaging materials and equipment, and especially for cold or hot aseptic packaging. Examples of process facilities in which the fouling control composition or the di-cationic or multiple charged cationic compounds can be employed include a milk line dairy, a continuous brewing system, food processing lines such as pumpable food systems and beverage lines, ware wash machines, low temperature ware wash machines, dishware, bottle washers, bottle chillers, warmers, third sink washers, processing equipment such as tanks, vats, lines, pumps and hoses (i.e., dairy processing equipment for processing milk, cheese, ice cream and other dairy products), and transportation vehicles. The fouling control composition or the di-cationic or multiple charged cationic compounds can be used to inhibit corrosion in tanks, lines, pumps, and other equipment used for the manufacture and storage of soft drink materials, and also used in the bottling or containers for the beverages.

The fouling control composition or the di-cationic or multiple charged cationic compounds can also be used on or in other industrial equipment and in other industrial process streams such as heaters, cooling towers, boilers, retort waters, rinse waters, aseptic packaging wash waters, and the like. The fouling control composition or the di-cationic or multiple charged cationic compounds can be used to treat surfaces in recreational waters such as in pools, spas, recreational flumes and water slides, fountains, and the like.

The fouling control composition or the di-cationic or multiple charged cationic compounds can be used to treat metal surfaces contacted with cleaners in surfaces found in janitorial and/or housekeeping applications, food processing equipment and/or plant applications, and in laundry applications. For example, washers, such as tunnel washers for washing textiles, can be treated according to methods disclosed herein.

The fouling control composition or the di-cationic or multiple charged cationic compounds can be dispensed in any suitable method generally known by one skilled in the art. For example, a spray-type dispenser can be used. A spray-type dispenser functions by impinging a water spray upon an exposed surface of a composition to dissolve a portion of the composition, and then immediately directing the concentrate solution including the composition out of the dispenser to a storage reservoir or directly to a point of use.

The fouling control composition or the di-cationic or multiple charged cationic compounds can be dispensed by immersing either intermittently or continuously in the water, fluid, or gas of the water system. The fouling control composition or the di-cationic or multiple charged cationic compounds can then dissolve, for example, at a controlled or predetermined rate. The rate can be effective to maintain a concentration of the dissolved compounds or compositions that are effective for use according to the methods disclosed herein.

The fouling control composition disclosed herein can comprise from about 80 to about 99.9 wt-% of the carrier, biocide, corrosion inhibitor, additional fouling control agent, a combination thereof; from about 0.1 wt-% to about 20 wt-% of one or more di-cationic or multiple charged cationic compounds, from about 1 wt-% to about 60 wt-% of the carrier, biocide, corrosion inhibitor, additional fouling control agent, a combination thereof and from about 20 wt-% to about 98.9 wt. % water; from about 10 wt-% to about 20 wt-% of one or more di-cationic or multiple charged cationic compounds, from about 30 wt-% to about 40 wt-% of the carrier, biocide, corrosion inhibitor, additional fouling control agent, a combination thereof and from about 40 wt-% to about 60 wt. % water; or from about 15 wt-% to about 20 wt-% of one or more di-cationic or multiple charged cationic compounds, from about 1 wt-% to about 10 wt-% of the carrier, biocide, corrosion inhibitor, additional fouling control agent, a combination thereof and from about 70 wt-% to about 84 wt. % of water.

In one aspect, disclosed herein is a method of controlling microbial fouling in a water system, wherein the method comprises providing a fouling control composition into a water system to generate a treated water system, wherein the fouling control composition comprises a compound or its salt derived from an aza-Michael Addition Reaction between a primary amine or polyamine and an α,β-unsaturated carbonyl compound according to the following formula

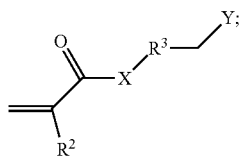

or from an aza-Michael Addition Reaction between polyamine and an α,β-unsaturated carbonyl compound according to the following formula

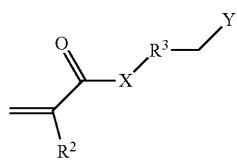

and a ring opening reaction from an epoxide according to the following formula

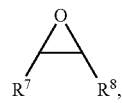

wherein X is NH or O; $R^2$ is H, $CH_3$, or an unsubstituted, linear or branched $C_2$-$C_{10}$ alkyl, alkenyl, or alkynyl group; $R^3$ is absent or an unsubstituted, linear or branched $C_1$-$C_{30}$ alkylene group; Y is $-NR_4R_5R_6^{(+)}$; $R^4$, $R^5$, and $R^6$ are independently a $C_1$-$C_{10}$ alkyl group; $R^7$ is H or alkyl; and $R^8$ is alkyl, or $-(CH_2)_k-$O-alkyl, wherein k is an integer of 1-30; wherein the compound is di-cationic compound having two

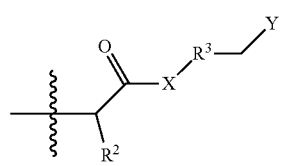

groups, a multiple charged cationic compound having 1, 2, 3, or more

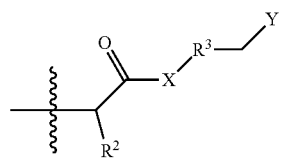

groups, or a multiple charged cationic compound having 1, 2, 3, or more

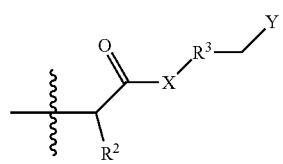

groups and at least one

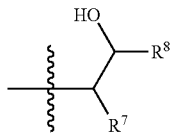

groups. In some embodiments, the fouling control composition mitigates bacterial growth or biofilm growth in the water system.

In another aspect, provided herein is a fouling control composition, wherein the composition comprises one or more additional fouling control agents and a compound or its salt derived from an aza-Michael Addition Reaction between a primary amine or polyamine and an α,β-unsaturated carbonyl compound according to the following formula

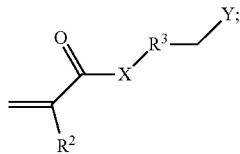

or
from an aza-Michael Addition Reaction between a polyamine and an α,β-unsaturated carbonyl compound according to the following formula

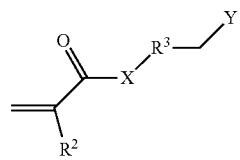

and a ring opening reaction from an epoxide according to the following formula

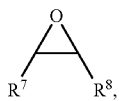

wherein X is NH or O; $R^2$ is H, $CH_3$, or an unsubstituted, linear or branched $C_2$-$C_{10}$ alkyl, alkenyl, or alkynyl group; $R^3$ is absent or an unsubstituted, linear or branched $C_1$-$C_{30}$ alkylene group; Y is —$NR_4R_5R_6^{(+)}$; $R^4$, $R^5$, and $R^6$ are independently a $C_1$-$C_{10}$ alkyl group; $R^7$ is H or alkyl; and $R^8$ is alkyl, or —$(CH_2)_k$—O-alkyl, wherein k is an integer of 1-30; wherein the compound is di-cationic having two

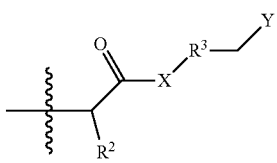

groups, a multiple charged cationic compound having 1, 2, 3, or more

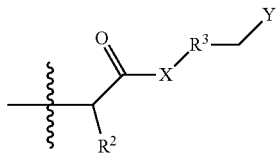

groups, or a multiple charged cationic compound having 1, 2, 3, or more

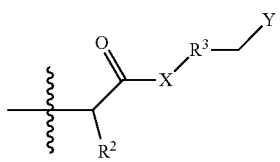

groups and at least one

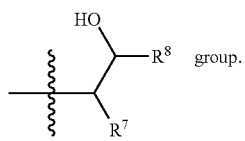 group.

In some embodiments, the fouling control composition mitigates bacterial growth or biofilm growth in the water system.

In some embodiments, the compound or its salt is derived from an aza-Michael Addition Reaction between a primary amine and an α,β-unsaturated carbonyl compound. In some other embodiments, the compound or its salt is derived from an aza-Michael Addition Reaction between a polyamine and an α,β-unsaturated carbonyl compound. the compound or its salt is derived from both an aza-Michael Addition Reaction between a polyamine and an α,β-unsaturated carbonyl compound and a ring opening reaction between the polyamine and an epoxide.

In some embodiments of the disclosed compounds herein, X is NH. In some other embodiments, X is O.

In some embodiments, $R^2$ is H. In some embodiments, $R^2$ is $CH_3$. In yet some other embodiments, $R^2$ is $CH_3CH_3$, $CH_2CH_2CH_3$, or $CH(CH_3)_2$.

In some embodiments, Y is —$NR_4R_5R_6^{(+)}$. In some other embodiments, Y is —$NR_4R_5R_6^{(+)}$, and $R^4$, $R^5$, and $R^6$ are independently $CH_3$. In yet some other embodiments, Y is —$NR_4R_5R_6^{(+)}$, and $R^4$ and $R^5$, independently $CH_3$, and $R^6$ is a $C_2$-$C_{12}$ aromatic alkyl. In some other embodiments, Y is —$NR_4R_5R_6^{(+)}$, and $R^4$ and $R^5$, independently $CH_3$, and $R^6$ is —$CH_2$—$C_6H_6$.

In some embodiments, Y is —$NR_4R_5R_6^{(+)}$ and the counter ion for Y any negative charged ion or species. In some other embodiments, the counter ion for Y is chloride, bromide, fluoride, iodide, acetate, aluminate, cyanate, cyanide, dihydrogen phosphate, dihydrogen phosphite, formate, carbonate, hydrogen carbonate, hydrogen oxalate, hydrogen sulfate, hydroxide, nitrate, nitrite, thiocyanate, or a combination thereof.

In some embodiments, $R^3$ is $CH_2$. In some other embodiments, $R^3$ is $CH_2CH_2$. In other embodiments, $R^3$ is $C(CH_3)_2$.

In yet some other embodiments, $R^3$ is an unsubstituted, linear, and saturated $C_1$-$C_{20}$ alkylene group. In some embodiments, $R^3$ is an unsubstituted, linear, and unsaturated $C_1$-$C_{20}$ alkylene group.

In some embodiments, $R^3$ is a linear $C_8$-$C_{18}$ alkyl, alkenyl, or alkynyl group. In some other embodiments, $R^3$ is a branched $C_8$-$C_{20}$ alkyl, alkenyl, or alkynyl group.

In some embodiments, the fouling control composition comprises a compound or its salt derived from a primary amine. In some embodiments, the primary amine is $R^{11}NH_2$, wherein $R^{11}$ is $R^1$ or $R^1$—Z—$(CH_2)_m$—; and $R^1$ is an unsubstituted or substituted, linear or branched $C_1$-$C_{30}$ alkyl, cyclic alkyl, alkenyl, or alkynyl group.

In other words, the compound or its salt has a structure according to Formula I,

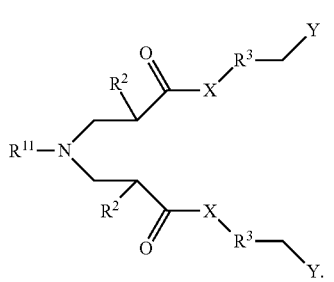

In some embodiments, $R^1$ is a linear $C_1$-$C_{30}$ alkyl, alkenyl, or alkynyl group. In some other embodiments, $R^1$ is a branched $C_1$-$C_{30}$ alkyl, alkenyl, or alkynyl group. In yet some other embodiments, $R^1$ is a linear and saturated $C_5$-$C_{30}$ alkyl group. In some other embodiments, $R^1$ is a branched and saturated $C_5$-$C_{30}$ alkyl group.

In some embodiments, $R^1$ is a linear $C_1$-$C_{30}$ alkenyl group with one or more double bonds. In some other embodiments, wherein $R^1$ is a branched $C_1$-$C_{30}$ alkenyl group with one or more double bonds.

In some embodiments, $R^1$ is a linear $C_1$-$C_{30}$ alkynyl group with one or more triple bonds. In some other embodiments, $R^1$ is a branched $C_1$-$C_{30}$ alkynyl group with one or more triple bonds.

In some embodiments, $R^{11}$ is a linear and saturated $C_2$-$C_{20}$ alkyl group. In some other embodiments, $R^{11}$ is a trans $C_2$-$C_{20}$ alkenyl group with at least one double bond. In some other embodiments, $R^{11}$ is a $C_2$-$C_{20}$ alkenyl group with at least one double bond of trans configuration. In some embodiments, $R^{11}$ is a cis $C_2$-$C_{20}$ alkenyl group with at least one double bond. In some other embodiments, $R^{11}$ is a $C_2$-$C_{20}$ alkenyl group with at least one double bond of cis configuration.

In some embodiments, $R^{11}$ is $R^1$—NH—$CH_2CH_2CH_2$ group and $R^1$ is a linear and saturated $C_1$-$C_{20}$ alkyl, a trans alkenyl, or a cis alkenyl group.

In some embodiments, the fouling control composition comprises a compound or its salt derived from a polyamine. In some other embodiments, the fouling control composition comprises a compound or its salt derived from a polyamine, wherein the compound has 2, 3, or more positive charges.

In some embodiments, the polyamine is $NH_2$—$[R^{10'}]_n$—$NH_2$, $(RNH)_n$—$RNH_2$, $H_2N$—$(RNH)_n$—$RNH_2$, or $H_2N$—$(RN(R'))_n$—$RNH_2$, wherein $R^{10'}$ is a linear or branched, unsubstituted or substituted $C_2$-$C_{10}$ alkylene group, or combination thereof; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$; and n can be from 2 to 1,000,000. The monomer in a polyamine, e.g., the R or R' group, can be the same or different. In this disclosure, a polyamine refers to both small molecule polyamine when n is from 1 to 9 and polymeric polyamine when n is from 10 to 1,000,000.

In other words, the multiple charged ionic compound can have a formula of $NA_2$-$[R^{10'}]_n$—$NA_2$, $(RNA)_n$-$RNA_2$, $NA_2$-$(RNA)_n$-$RNA_2$, or $NA_2$-$(RN(R'))_n$—$RNA_2$, or the like, wherein $R^{10'}$ is a linear or branched, unsubstituted or substituted $C_4$-$C_{10}$ alkylene group; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNA_2$, $RNARNA_2$, or $RN(RNA_2)_2$; n can be from 2 to 1,000,000; A is a combination of H and

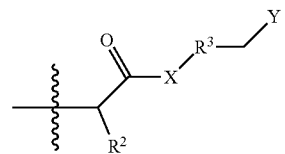

or a combination of H,

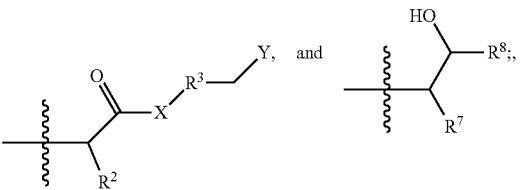

wherein X is NH or O; $R^2$ is H, $CH_3$, or an unsubstituted, linear or branched $C_2$-$C_{10}$ alkyl, alkenyl, or alkynyl group; $R^3$ is absent or an unsubstituted, linear or branched $C_1$-$C_{30}$ alkylene group; Y is —$NR_4R_5R_6^{(+)}$; $R^4$, $R^5$, and $R^6$ are independently a $C_1$-$C_{10}$ alkyl group; $R^7$ is H or alkyl; and $R^8$ is alkyl, or —$(CH_2)_k$—O-alkyl, wherein k is an integer of 1-30; wherein the compound is a multiple charged cationic compound having 1, 2, 3, or more positive charges from the activated olefin or a multiple charged cationic compound having 1, 2, 3, or more positive charges from the activated olefin and at least one nonionic group from the epoxide.

In some embodiments, A is positively charged

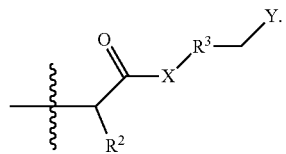

In some embodiments. A is positively charged

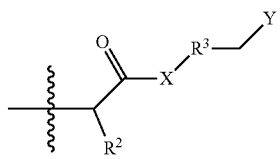

and nonionic

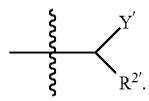

In some embodiments, at least two of the primary NH$_2$ protons were replaced by

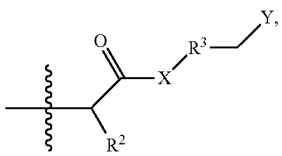

at least one of the primary NH$_2$ or secondary NH were replaced by

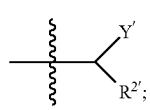

and the rest of primary NH$_2$ protons remains. In some embodiments, all of primary NH$_2$ and some of secondary NH proton are replaced by

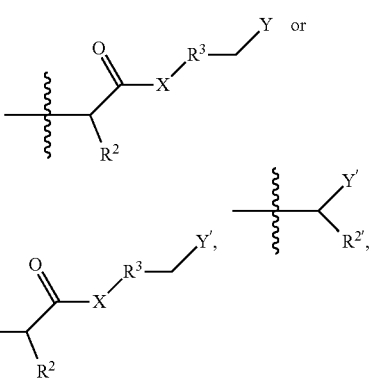

and

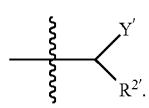

Nevertheless, the compounds used in the fouling control compositions are di-cationic compounds having two

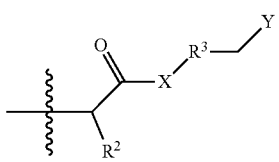

groups, multiple charged cationic compounds having 2, 3, or more

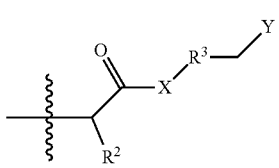

groups and at least one

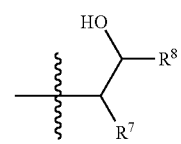

groups; or multiple charged cationic compounds having 2, 3, or more

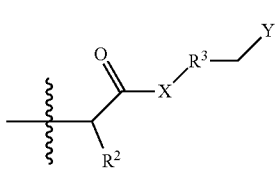

groups and at least one

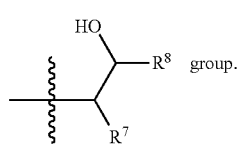 group.

Exemplary general schemes to show the structures of and the reactions leading to the di-cationic or multiple charged cationic compounds using a linear polyethyleneimine is shown in FIG. 1-FIG. 6.

Figure 2:
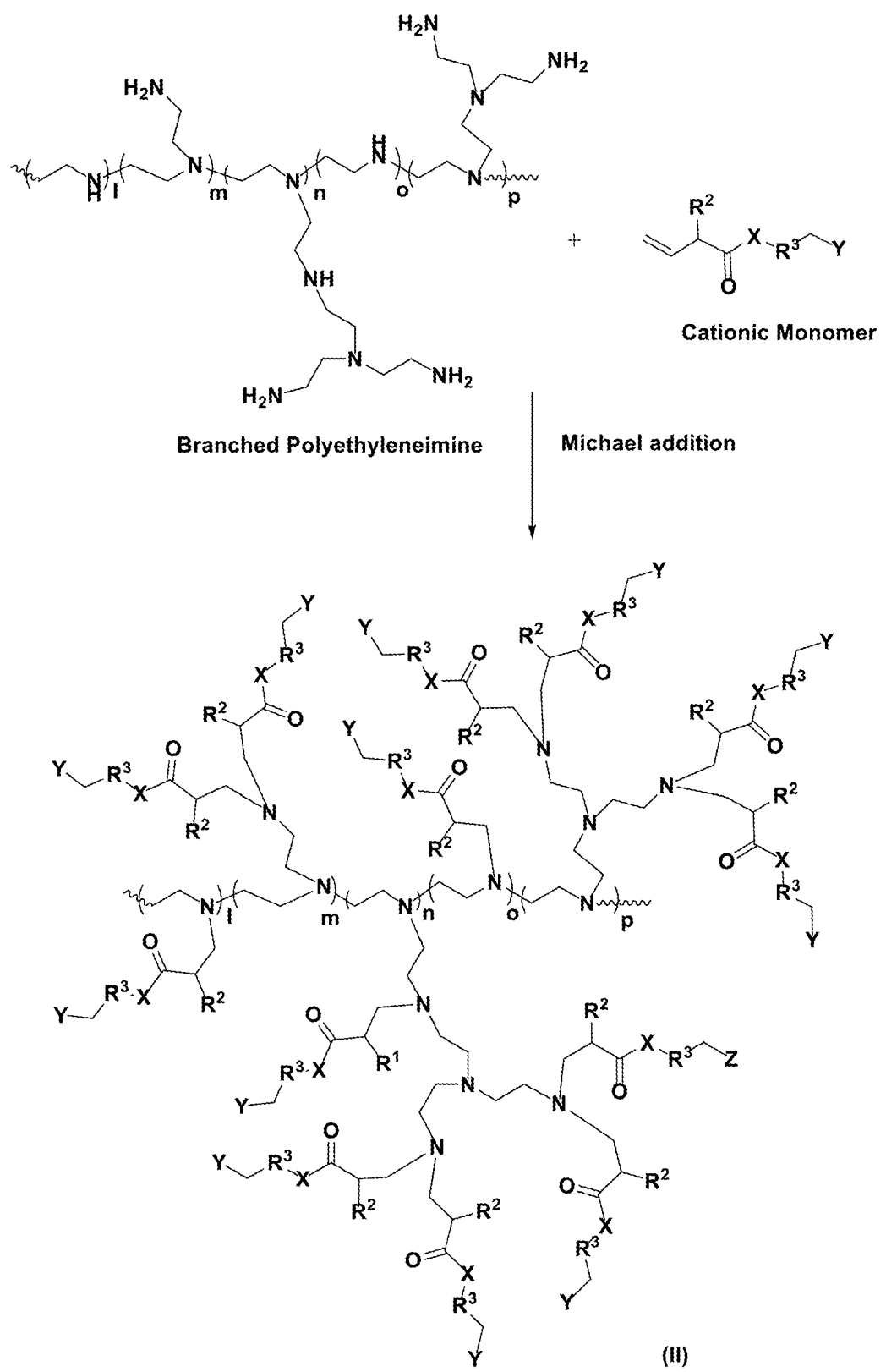
FIG. 2 shows a generic reaction scheme to produce a multiple charged cationic compound by an aza-Michael addition reaction between a branch polyamine and an α,β-unsaturated carbonyl compound.

FIG. 1 shows a generic reaction scheme to produce a multiple charged cationic compound by an aza-Michael addition reaction between a linear polyamine and an α,β-unsaturated carbonyl compound. FIG. 2 shows a generic reaction scheme to produce a multiple charged cationic compound by an aza-Michael addition reaction between a branch polyamine and an α,β-unsaturated carbonyl compound.

In FIG. 1 and FIG. 2, k, l, m, m, o, or p is an integer of 1-100; X is NH or O; R$^2$ is H, CH$_3$, or an unsubstituted, linear or branched C$_2$-C$_{10}$ alkyl group; R$^3$ is absent or an unsubstituted, linear or branched $C_1$-$C_{30}$ alkylene group; Y is —$NR^4R^5R^{6(+)}$, or a salt thereof; $R^4$, $R^5$, and $R^6$ are independently $C_1$-$C_{10}$ alkyl group or benzyl group.

The structures I and II in FIG. 1 and FIG. 2 are depiction of generalized reaction products. In structures I and II, all the secondary and primary amines in the polyethyleneimine react with the α,β-unsaturated carbonyl compounds so that no secondary amines remain. It is possible that in the disclosed multiple charged cationic compounds, some secondary or primary amine groups do not react completely with the α, β-unsaturated carbonyl compounds and remain as primary or secondary amines in multiple charged cationic compounds or their salts.

Figure 3:
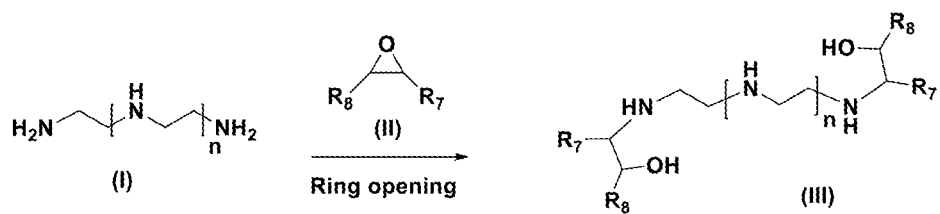
FIG. 3 shows a generic reaction scheme to produce a multiple charged cationic compound first by a ring-opening reaction between a linear polyethyleneimine and epoxide and then an aza-Michael addition reaction with an α,β-unsaturated carbonyl compound.
Figure 3:
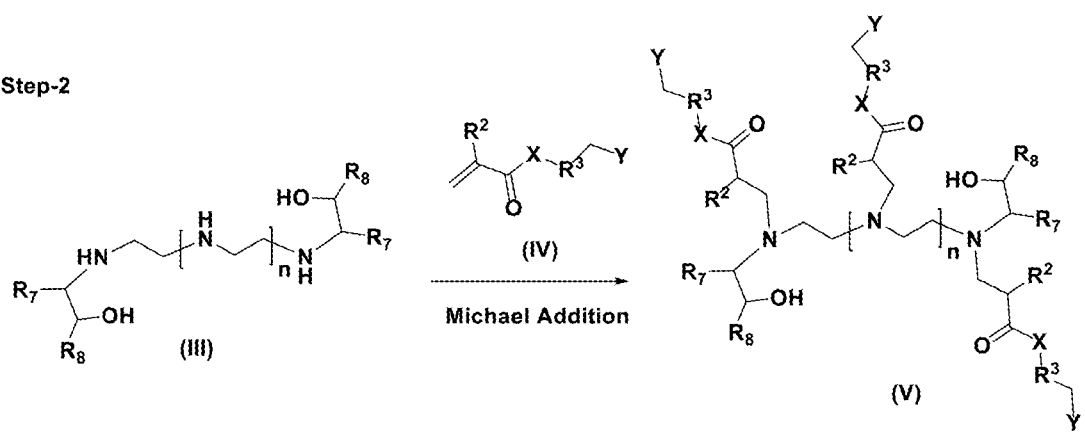
Figure 4:
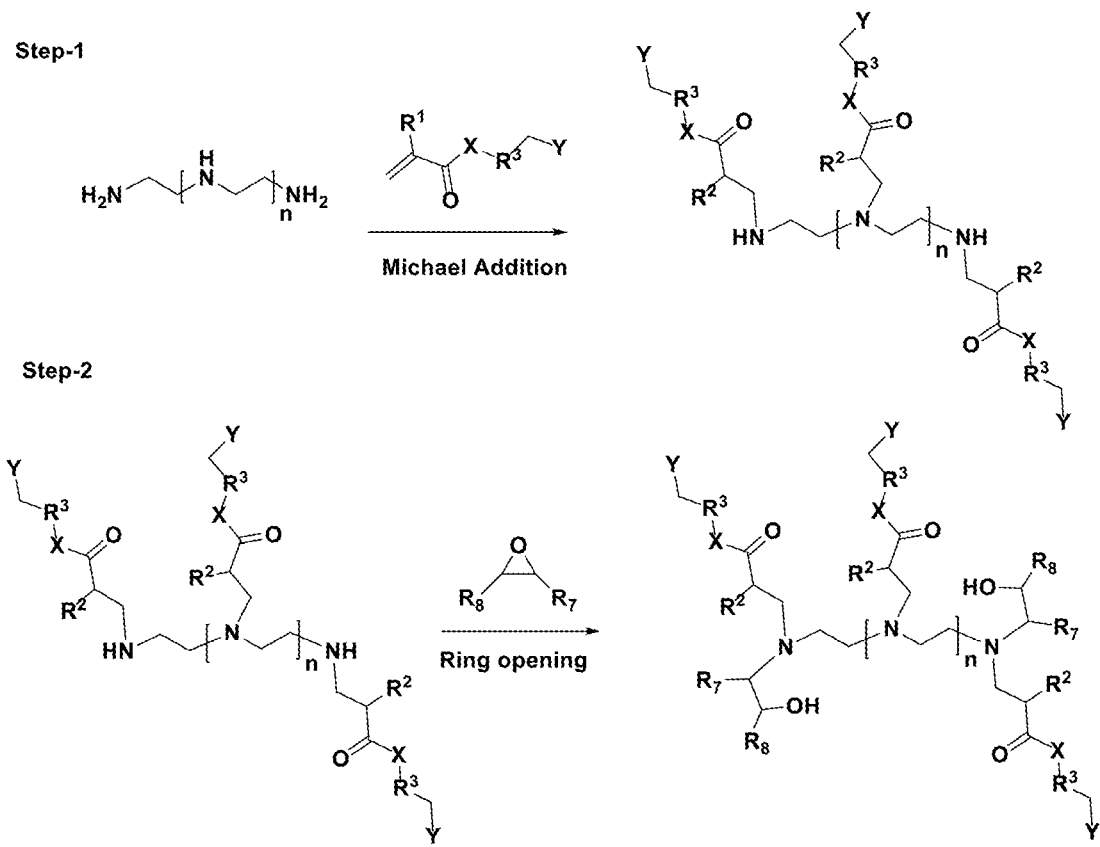
FIG. 4 shows a generic reaction scheme to produce a multiple charged cationic compound first by an aza-Michael addition reaction between a linear polyamine and α,β-unsaturated carbonyl compound and then a ring-opening reaction with an epoxide.
Figure 5:
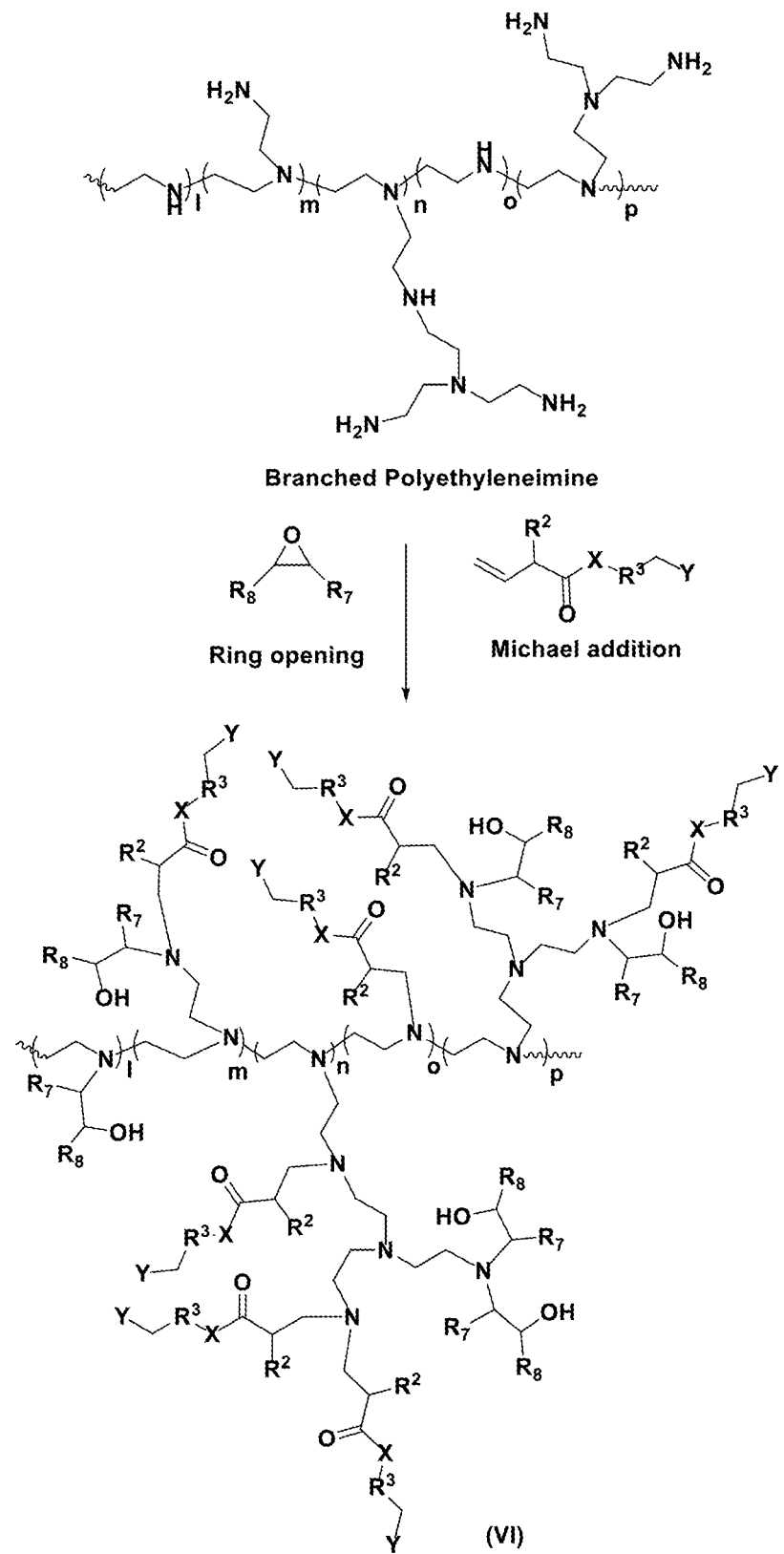
FIG. 5 shows an alternative generic reaction scheme to produce a multiple charged cationic compound by a ring-opening reaction and aza-Michael addition reaction among a branched polyamine, epoxide and α,β-unsaturated carbonyl compound.

FIG. 3 shows a generic reaction scheme to produce a multiple charged cationic compound first by a ring-opening reaction between a linear polyethyleneimine and epoxide and then an aza-Michael addition reaction with an α,β-unsaturated carbonyl compound. FIG. 4 shows a generic reaction scheme to produce a multiple charged cationic compound first by an aza-Michael addition reaction between a linear polyamine and α,β-unsaturated carbonyl compound and then a ring-opening reaction with an epoxide. FIG. 5 shows an alternative generic reaction scheme to produce a multiple charged cationic compound by a ring-opening reaction and aza-Michael addition reaction among a branch polyamine, epoxide and α,β-unsaturated carbonyl compound.

In FIG. 3, FIG. 4, and FIG. 5, k, 1, m, m, o, or p is an integer of 1-100; X is NH or O; $R^2$ is H, $CH_3$, or an unsubstituted, linear or branched $C_2$-$C_{10}$ alkyl group; $R^3$ is absent or an unsubstituted, linear or branched $C_1$-$C_{30}$ alkylene group; Y is —$NR^4R^5R^{6(+)}$, or a salt thereof; $R^4$, $R^5$, and $R^6$ are independently $C_1$-$C_{10}$ alkyl group or benzyl group; $R^7$ is H or alkyl; and $R^8$ is alkyl, or —$(CH_2)_k$—O-alkyl.

The structures V and VI in FIG. 3, FIG. 4, and FIG. 5 are depiction of generalized reaction products. In structures V and VI, all the secondary and primary amines in the polyethyleneimine react with epoxides and α,β-unsaturated carbonyl compounds so that no secondary amines remain. It is possible that in the disclosed modified polyamines, some secondary or primary amine groups do not react completely with either the epoxide or α,β-unsaturated carbonyl compounds and remain as primary or secondary amines in the modified polyamine compound or its salt.

Figure 6:
FIG. 6 shows a generic reaction scheme to produce a di-cationic compound by an aza-Michael addition reaction between a primary amine and an α,β-unsaturated carbonyl compound.

FIG. 6 shows a generic reaction scheme to produce a di-cationic compound by an aza-Michael addition reaction between a primary amine and an α,β-unsaturated carbonyl compound.

In FIG. 6, n is an integer of 1-20; X is NH or O; $R^2$ is H, $CH_3$, or an unsubstituted, linear or branched $C_2$-$C_{10}$ alkyl group; $R^{11}$ is $R^1$ or $R^1$—Z—$(CH_2)_m$—; m is an integer of 1-4; $R^1$ is an unsubstituted or substituted, linear or branched $C_1$-$C_{30}$ alkyl, cyclic alkyl, alkenyl, or alkynyl group.

In some embodiments, the polyamine is a linear, branched, or dendrimer polyamine with a general formula of —[RNH]$_n$—, wherein R is —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof and n is an integer of 3, 4, 5, 6, 7-9, or from 10 to 1,000,000.

In some embodiments, the polyamine is a linear, branched, or dendrimer polyamine with a general formula of (RNH)$_n$—$RNH_2$, wherein R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof and n can be from 2 to 1,000,000. In some embodiments, R is the same in each monomer. In some other embodiments, R can be different from one monomer to another monomer.

In some other embodiments, the polyamine is a linear, branched, or dendrimer polyamine with a general formula of $H_2N$—(RNH)$_n$—$RNH_2$, wherein R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof and n can be from 2 to 1,000,000. In some embodiments, R is the same in each monomer. In some other embodiments, R can be different from one monomer to another monomer.

In yet some other embodiments, the polyamine is a linear, branched, or dendrimer polyamine with a general formula of $H_2N$—(RN(R'))$_n$—$RNH_2$, wherein R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$; and n can be from 2 to 1,000,000. In some embodiments, R or R' is the same in each monomer. In some other embodiments, R or R' can be different from one monomer to another monomer.

In some embodiments, the polyamine is one with a general formula of $NH_2$—[$R^{10}$]$_n$—$NH_2$, wherein $R^{10}$ is a linear or branched, unsubstituted or substituted $C_4$-$C_{10}$ alkylene group, or combination thereof and n is an integer of 3, 4, 5, 6, 7-9, or 10 to 1,000,000.

In some embodiments, the polyamine is one or more of polyamines under JEFFAMINE® by Huntsman.

In some embodiments, the polyamine comprises an alkyleneamine, the alkyleneamine comprising ethylenediamine, diethylenetriamine, triethylenetetramine, tetraethylenepentamine, pentaethylenehexamine, hexaethyleneheptamine, polyethyleneimine, tris(2-aminoethyl)amine, or a mixture thereof.

In some other embodiments, the polyamine is a mixture of monoamine, diamine, and triamine with a polyether backbone or with a polyether backbone based on propylene oxide (PO), ethylene oxide (EO), or a mixture of both oxides In some embodiments, the polyamine is an unmodified polyamine. In some other embodiments, the polyamine is a modified polyamine.

In yet some other embodiments, the polyamine is an ethoxylated polyamine, propylated polyamine, polyamine with polyquat, polyamine with polyglycerol, or combination thereof.

In yet some other embodiments, the polyamine is a linear, branched, or dendrimer polyethyleneimine. In some other embodiments, the polyamine comprises only primary and secondary amine groups. In some embodiments, the polyamine comprises only primary, secondary, and tertiary amine groups. In some other embodiments, the polyamine comprises only primary and tertiary amine groups.

In some embodiments, the polyamine is a single compound. In some other embodiments, the polyamine is a mixture of two or more different polyamines, wherein the different polyamines have different molecular weight, different structure, or both.

In some embodiments, the polyamine has an average molecular weight ($M_w$) of from about 60 to about 2,000,000 Da. In some other embodiments, the polyamine has an average molecular weight ($M_w$) of from about 60 to about 5,000 Da. In yet some other embodiments, the polyamine has an average molecular weight ($M_w$) of from about 60 to about 25,000 Da.

In some embodiments, the polyamine has an average molecular weight ($M_w$) of about 60-200, about 100-400, about 100-600, about 600-5,000, about 600-800, about 800-2,000, about 100-5,000, about 100-2,000,000, about 100-25,000, about 600-25,000, about 800-25,000, about 600-750,000, about 800-750,000, about 25,000-750,000, about 750,000-2,000,000, about 100, about 200, about 300, about 400, about 500, about 600, about 700, about 800, about 1,000, about 1,500, about 2,000, about 3,000, about 5,000, about 8,000, about 10,000, about 15,000, about 20,000, about 50,000, about 100,000, about 250,000, about 500,000, about 1,000,000, about 2,000,000, or any value there between.

In some embodiments, the polyamine is diamine or triamine having an average molecular weight ($M_w$) of from about 130 to about 4,000.

In some embodiments, the compound is a mixture derived from a linear polyethyleneimine and (3-acrylamidopropyl) trimethylammonium chloride (APTAC). In some other embodiments, the compound is a mixture derived from a linear polyethyleneimine and [3-(methacryloylamino)propyl]trimethylammonium chloride (MAPTAC).

In some other embodiments, the multiple charged cationic compound is a mixture derived from a branched polyethyleneimine and (3-acrylamidopropyl)trimethylammonium chloride (APTAC). In some other embodiments, the compound is a mixture derived from a linear polyethyleneimine and [3-(methacryloylamino)propyl]trimethylammonium chloride (MAPTAC).

In some embodiments, the α,β-unsaturated carbonyl compound is (3-acrylamidopropyl)trimethylammonium chloride (APTAC), [3-(methacryloylamino)propyl]trimethylammonium chloride (MAPTAC), 2-(acryloyloxy)-N,N,N-trimethylethanaminium chloride (DMAEA-MCQ), N,N-dimethylaminoethyl acrylate benzyl chloride quaternary salt (DMAEA-BCQ), or 2-(methacryloyloxy)-N,N,N-trimethylethan-1-aminium methyl sulfate (DMAEA-MSQ).

In some other embodiments, the α,β-unsaturated carbonyl compound is (3-acrylamidopropyl)trimethylammonium chloride (APTAC), [3-(methacryloylamino)propyl]trimethylammonium chloride (MAPTAC), or mixture thereof.

In some other embodiments, the α,β-unsaturated carbonyl compound is 2-(acryloyloxy)-N,N,N-trimethylethanaminium chloride (DMAEA-MCQ), N,N-dimethylaminoethyl acrylate benzyl chloride quaternary salt (DMAEA-BCQ), 2-(methacryloyloxy)-N,N,N-trimethylethan-1-aminium methyl sulfate (DMAEA-MSQ), or mixture thereof.

In some embodiments, the compound is a mixture derived from a linear polyethyleneimine and (3-acrylamidopropyl) trimethylammonium chloride (APTAC). In some other embodiments, the compound is a mixture derived from a linear polyethyleneimine and [3-(methacryloylamino)propyl]trimethylammonium chloride (MAPTAC).

In some other embodiments, the multiple charged cationic compound is a mixture derived from a branched polyethyleneimine and 3-acrylamidopropyl)trimethylammonium chloride (APTAC). In some other embodiments, the compound is a mixture derived from a linear polyethyleneimine and [3-(methacryloylamino)propyl]trimethylammonium chloride (MAPTAC).

In some embodiments, $R^7$ is H. In some other embodiments, $R^7$ is $CH_3$. In yet some other embodiments, $R^7$ is a $C_2$-$C_4$ alkyl.

In some embodiments; $R^8$ is a $C_1$-$C_{30}$ alkyl. In some other embodiments, $R^8$ is $C_8$-$C_4$ alkyl. In yet some other embodiments, $R^8$ is a $C_8$-$C_{20}$ alkyl.

In some embodiments, $R^8$ is —$(CH_2)_k$—O-alkyl, wherein k is an integer of 1-30 and the alkyl group is $C_1$-$C_{30}$ alkyl group.

In some embodiments, the epoxide is an alkylglyicdal ether, butylglycidal ether hexylglycidal ether, octylglycidal ether, decyglycidal ether, dodecyglycidal ether, a 1,2-epoxyalkane, 1,2-epoxytertadecane, 1,2-epoxydodecane, or 1,2-epoxyoctane, or mixture thereof. In some other embodiments, the epoxide is an alkylglyicdal ether or 1,2-epoxyalkane. In yet some other embodiments, the epoxide is hexylglycidal ether, octylglycidal ether, dodecyglycidal ether, or mixture thereof. In some other embodiments, the epoxide is 1,2-epoxytertadecane, 1,2-epoxydodecane, 1,2-epoxydecane, or 1,2-epoxyoctane, or mixture thereof.

In some embodiments, the compound is soluble or dispersible in water or the fouling control composition.

In some embodiments, the fouling control composition comprises a carrier, wherein the carrier is water, an organic solvent, or a mixture thereof.

In some embodiments, the fouling control composition further comprises an organic solvent. In some other embodiments, the fouling control composition further comprises an organic solvent and water.

In some embodiments, the organic solvent is an alcohol, a hydrocarbon, a ketone, an ether, an alkylene glycol, a glycol ether, an amide, a nitrile, a sulfoxide, an ester, or any combination thereof. In some other embodiments, the organic solvent is an alcohol, an alkylene glycol, an alkyleneglycol alkyl ether, or a combination thereof. In yet some embodiments, the organic solvent is methanol, ethanol, propanol, isopropanol, butanol, isobutanol, monoethyleneglycol, ethyleneglycol monobutyl ether, or a combination thereof.

In some embodiments, the organic solvent is methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, a mixture thereof with water, or any combination thereof.

In some embodiments, wherein the fouling control composition further comprises one or more of corrosion inhibitors. In some embodiments, wherein the fouling control composition further comprises one or more of corrosion inhibitors and a carrier. In some embodiments, the corrosion inhibitor is an imidazoline compound, a pyridinium compound, or a combination thereof.

In some embodiments, the fouling control composition further comprises an additional fouling control agent. In some embodiments, the additional fouling control agent is a single quat compound.

In some embodiments, the fouling control composition further comprises a biocide. In some embodiments, the fouling control composition further comprises a biocide and carrier. In some other embodiments, the fouling control composition further comprises a biocide, corrosion inhibitor, and carrier. In some embodiments, the fouling control composition further comprises an oxidizing biocide. In some embodiments, the fouling control composition further comprises a non-oxidizing biocide.

In some other embodiments, the biocide is chlorine, hypochlorite, $ClO_2$, bromine, ozone, hydrogen peroxide, peracetic acid, peroxycarboxylic acid, peroxycarboxylic acid composition, peroxysulphate, glutaraldehyde, dibromonitrilopropionamide, isothiazolone, terbutylazine, polymeric biguanide, methylene bisthiocyanate, tetrakis hydroxymethyl phosphonium sulphate, and any combination thereof.

In some embodiments, the fouling control composition further comprises an organic sulfur compound. In some other embodiments, wherein the organic sulfur compound is a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof.

In some embodiments, the fouling control composition further comprises an acid. In some embodiments, the fouling control composition further comprises an inorganic acid, mineral acid, organic acid, or mixture thereof. In some embodiments, the fouling control composition comprises from about 1 wt-% to about 20 wt-% of the acid.

In some embodiments, the acid is hydrochloric acid, hydrofluoric acid, citric acid, formic acid, acetic acid, or mixture thereof.

In some embodiments, the fouling control composition further comprises a hydrogen sulfide scavenger. In some other embodiments, the hydrogen sulfide scavenger is an oxidant, inorganic peroxide, sodium peroxide, chlorine dioxide; a $C_1$-$C_{10}$ aldehyde, formaldehyde, glyoxal, glutaraldehyde, acrolein, or methacrolein, a triazine, monoethanolamine triazine, monomethylamine triazine, or a mixture thereof.

In some embodiments, the fouling control composition further comprises a surfactant. In some embodiments, the fouling control composition further comprises a surfactant, biocide, and carrier.

In some embodiments, the surfactant is a nonionic, cationic, anionic, amphoteric, zwitterionic, Gemini, di-cationic, di-anionic surfactant, or mixtures thereof.

In some embodiments, the surfactant is an alkyl phenol, fatty acid, or mixture thereof.

In some embodiments, the fouling control composition further comprises an asphaltene inhibitor, a paraffin inhibitor, a scale inhibitor, a gas hydrate inhibitor, a pH modifier, or any combination thereof.

In some embodiments, the fouling control composition further comprises an emulsion breaker, reverse emulsion breaker, coagulant/flocculant agent, a water clarifier, a dispersant, antioxidant, polymer degradation prevention agent, permeability modifier, foaming agent, antifoaming agent, emulsifying agent, scavenger agent for $CO_2$, and/or $O_2$, gelling agent, lubricant, friction reducing agent, salt, or mixture thereof.

In some embodiments, the fouling control composition further comprises a surfactant. In some other embodiments, the fouling control composition further comprises a foaming surfactant. In yet some other embodiments, the fouling control composition further comprises a defoaming surfactant or agent.

In some embodiments, the fouling control composition further comprises a preservative. In some other embodiments, the fouling control composition further comprises a non-oxidizing biocide, surfactant, biocide, and preservative. In yet some other embodiments, the fouling control composition further comprises a non-oxidizing biocide, surfactant, biocide, preservative and water clarifier. In some other embodiments, the fouling control composition further comprises a surfactant, biocide, preservative, and water clarifier.

In some embodiments, the fouling control composition is a liquid, gel, or a mixture comprising liquid/gel and solid.

In some embodiments, the fouling control composition or a use solution thereof has a pH of from about 2 to about 11.

In some embodiments, the fouling control composition comprises from about 20 wt-% to about 60 wt-% of the compound or a mixture thereof.

In some embodiments, the compound, or a mixture thereof has a concentration of from about 1 ppm to about 1000 ppm in the treated water system.

In some embodiments, the fouling control composition is provided to the water system independently, simultaneously, or sequentially with an additional functional ingredient.

In some embodiments, the water system comprises fresh water, recycled water, salt water, surface water, produced water, or mixture thereof. In some embodiments, the water system is a cooling water system, boiler water system, petroleum wells, downhole formations, geothermal wells, mineral washing, flotation and benefaction, papermaking, gas scrubbers, air washers, continuous casting processes in the metallurgical industry, air conditioning and refrigeration, water reclamation, water purification, membrane filtration, food processing, clarifiers, municipal sewage treatment, municipal water treatment, or potable water system.

In some embodiments, the fouling control composition or di-cationic or multiple charge cationic compounds disclosed herein can mitigate microbial or biofilm growth in a water system as indicated by MBEC (Minimum Biofilm Eradication Concentration) assay, American Society for Testing and Materials (ASTM) MBEC-E2799-12 (2011) assay, or the similar essay described in the Examples section of this disclosure, when the water system has a di-cationic, multiple charge cationic compound, or mixture thereof concentration of from about 1 ppm to about 1,000 ppm, from about 1 to about 900 ppm, from about 1 ppm to about 800 ppm, from about 1 ppm to about 700 ppm, from about 1 ppm to about 600 ppm, from about 1 ppm to about 500 ppm, from about 1 ppm to about 400 ppm, from about 1 ppm to about 300 ppm, from about 1 ppm to about 250 ppm, from about 1 ppm to about 200 ppm, from about 1 ppm to about 150 ppm, from about 1 ppm to about 100 ppm, from about 1 ppm to about 50 ppm, from about 1 ppm to about 25 ppm, from about 1 ppm to about 10 ppm, from about 0.5 ppm to about 2 ppm, about 950 ppm, about 850 ppm, about 750 ppm, about 650 ppm, about 550 ppm, about 450 ppm, about 350, about 250 ppm, about 150 ppm, about 50 ppm, about 25 ppm, about 10 ppm, about 5 ppm, about 2 ppm, about 1 ppm, about 0.5 ppm or any value there between, after dosing the water system with the di-cationic, multiple charge cationic compound, or mixture thereof, or the fouling control composition.

As used herein, the term "substantially free", "free" or "free of" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present disclosure may comprise, consist essentially of, or consist of the components and ingredients of the disclosed compositions or methods as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

EXAMPLES

Embodiments of the present disclosure are further defined in the following non-limiting Examples. These Examples, while indicating certain embodiments of this disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

Example 1

Synthesis of 3,3'-((3,3'-(dodecylazanediyl)bis(propanoyl))bis(azanediyl))bis(N,N,N-trimethylpropan-1-aminium) chloride (I)

Figure 7:
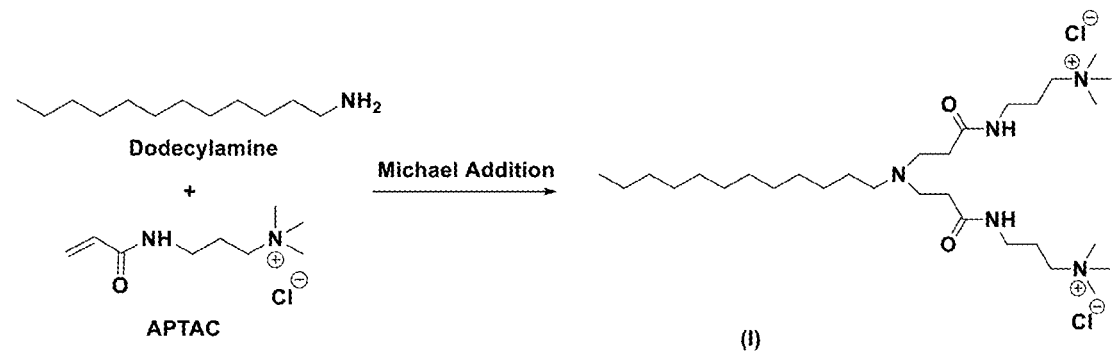
FIG. 7 shows a reaction scheme to produce 3,3'-((3,3'-(dodecylazanediyl)bis(propanoyl))bis(azanediyl))bis(N,N,N-trimethylpropan-1-aminium) chloride (I) as described in Example 1.

(3-acrylamidopropyl) trimethylammonium chloride (APTAC, 75%, 30 grams, 0.10 mol) was charged into a 250-mL three-necked RBF equipped with an overhead stirrer, temperature probe, and condenser. Benzyltrimethylammonium hydroxide (0.9 grams, 10%, 0.0005 mol) and water (63 g) were added into the flask. Dodecylamine (10 grams, 98%, 0.053 mol) was then added portion wise to the well-stirred reaction mixture. The resulting suspension was stirred at 80° C. overnight. As the reaction proceeded to completion, the suspension turned into a clear yellowish solution. The resulting (~31 wt %) aqueous solution of diquat surfactant was used as is. Mass spectrometry (+ESI-MS) confirmed synthesis of diquat surfactant II: calc. $[M-2Cl^-]^{2+}$ 263.76, found 263.7554; calc. $[M-Cl^-]^+$562.48, found 562.4806. The reaction is shown in FIG. 7.

Example 2

Synthesis of 3,3'-((3,3'-(hexadecylazanediyl)bis(propanoyl))bis(azanediyl))bis(N,N,N-trimethylpropan-1-aminium) chloride (II)

Figure 8:
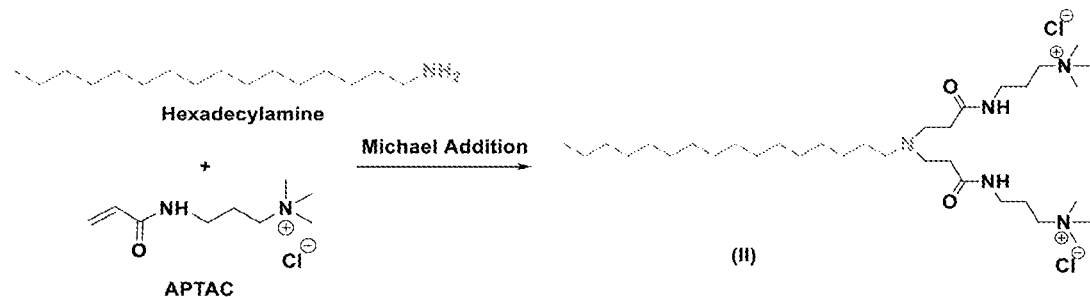
FIG. 8 shows a reaction scheme to produce 3,3'-((3,3'-(hexadecylazanediyl)bis(propanoyl))bis(azanediyl))bis(N,N,N-trimethylpropan-1-aminium) chloride (II) as described in Example 2.

(3-acrylamidopropyl) trimethylammonium chloride (APTAC, 75%, 41 grams, 0.149 mol) was charged into a 250-mL three-necked RBF equipped with an overhead stirrer, temperature probe, and condenser. Benzyltrimethylammonium hydroxide (0.9 grams, 10%, 0.0005 mol) and water (100 g) were added into the flask. Hexadecylamine (20 grams, 90%, 0.0745 mol) was then added portion wise to the well-stirred reaction mixture. The resulting suspension was stirred at 80° C. overnight. As the reaction proceeded to completion, the suspension turned into a clear yellowish solution. The resulting (~30 wt %) aqueous solution of diquat surfactant was used as is. Mass spectrometry (+ESI/MS) confirmed synthesis of diquat surfactant III: calc. $[M-2Cl^-]^{2+}$ 291.79, found 291.7870; calc. $[M-Cl^-]^+$618.54, found 618.5439. The reaction is shown in FIG. 8.

Example 3

Synthesis of 3,3'-((3,3'-(octadec-9-en-1-ylazanediyl)bis(propanoyl)) bis(azanediyl)) bis(N,N,N-trimethylpropan-1-aminium) chloride (III)

Figure 9:
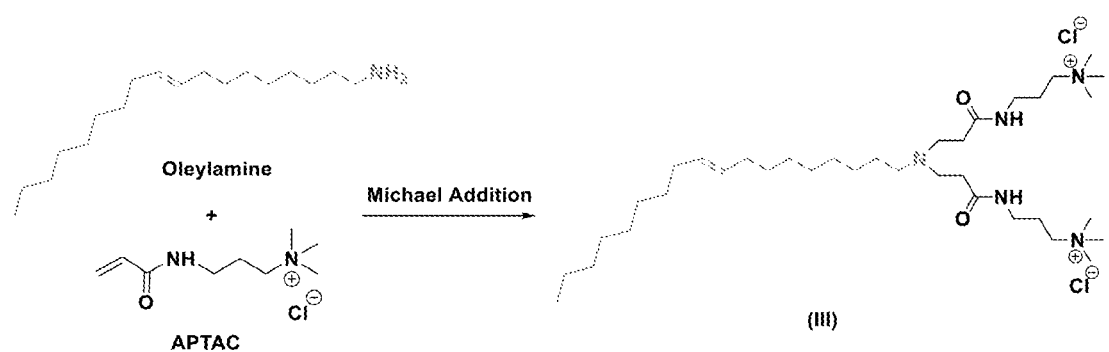
FIG. 9 shows a reaction scheme to produce 3,3'-((3,3'-(octadec-9-en-1-ylazanediyl) bis(propanoyl)) bis(azanediyl)) bis(N,N,N-trimethylpropan-1-aminium) chloride (III) as described in Example 3.

(3-acrylamidopropyl) trimethylammonium chloride (APTAC, 75%, 30 grams, 0.109 mol) was charged into a 250-mL three-necked RBF equipped with an overhead stirrer, temperature probe, and condenser. Benzyltrimethylammonium hydroxide (0.25 grams, 10%, 0.0001 mol) and water (70 g) were added into the flask. Oleylamine (15 grams, 95%, 0.053 mol) was then added portion wise to the well-stirred reaction mixture. The resulting suspension was stirred at 80° C. overnight. As the reaction proceeded to completion, the suspension turned into a clear yellowish solution. The resulting (~32 wt %) aqueous solution of diquat surfactant was used as is. Mass spectrometry (+ESI-MS) confirmed synthesis of diquat surfactant V: calc. $[M-2Cl^-]^{2+}$ 304.80, found 304.7949; calc. $[M-Cl^-]^+$644.56, found 644.5596. The reaction is shown in FIG. 9.

Example 4

Synthesis of 3,3'-((3,3'-(octylazanediyl)bis(propanoyl))bis(azanediyl))bis(N,N,N-trimethylpropan-1-aminium) chloride (IV)

Figure 10:
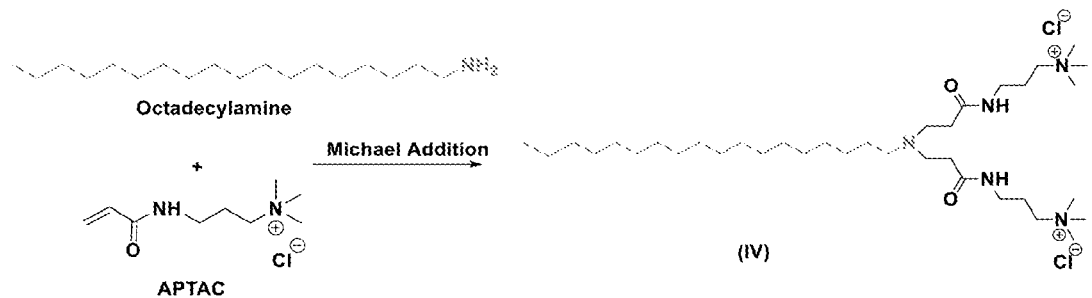
FIG. 10 shows a reaction scheme to produce 3,3'-((3,3'-(octylazanediyl)bis(propanoyl))bis(azanediyl))bis(N,N,N-trimethylpropan-1-aminium) chloride (IV) as described in Example 4.

(3-acrylamidopropyl) trimethylammonium chloride (APTAC, 75%, 40 grams, 0.145 mol) was charged into a 250-mL three-necked RBF equipped with an overhead stirrer, temperature probe, and condenser. Benzyltrimethylammonium hydroxide (0.9 grams, 10%, 0.0005 mol) and water (100 g) were added into the flask. Octadecylamine (20 grams, 98%, 0.072 mol) was then added portion wise to the well-stirred reaction mixture. The resulting suspension was stirred at 80° C. overnight. As the reaction proceeded to completion, the suspension turned into a clear yellowish solution. The resulting (~31 wt %) aqueous solution of diquat surfactant was used as is. Mass spectrometry (+ESI-MS) confirmed synthesis of diquat surfactant IV: calc. $[M-2Cl^-]^{2+}$ 305.80, found 305.8014; calc. $[M-Cl^-]^+$646.58, found 648.5791. The reaction is shown in FIG. 10.

Example 5

Synthesis of Ethyleneamine E-100/APTAC (1:2.5) Adduct

To a 250 mL three necked round-bottom flask equipped with temperature probe, condenser and magnetic stir bar were added polyethyleneamine E-100 (50 grams), (3-acrylamidopropyl)trimethylammonium chloride (APTAC, 75%, 121 grams) and water (20 grams) were added into the flask. The resulting mixture was stirred at 80° C. overnight. As the reaction proceeded to completion, mixture turned into a clear yellowish solution.

Example 6

Synthesis of a Multiple Charged Cationic Compound/Surfactant (7887-94A)

To a 250 mL three necked round-bottom flask equipped with a temperature probe, condenser and magnetic stir bar was added compound of Example 5 (Ethyleneamine E-100/APTAC 1:2.5 adduct, 74%, 50 grams). $C_{12}$-$C_{14}$ alkylglycidyl ether (CAS No: 68609-97-2, 41.5 grams) and isopropanol (40 grams) were then added into the flask. The resulting mixture was stirred at 90° C. overnight or until completion of reaction.

Example 7

Synthesis of TEPA/$C_{12}$-$C_{14}$ alkylglycidyl ether (1:3) Adduct

To a 250 mL three necked round-bottom flask equipped with a temperature probe, condenser and magnetic stir bar was added ERISYS™ GE 8 ($C_{12}$-$C_{14}$ alkylglycidyl ether, CAS No: 68609-97-2, 132 grams). Triethylenepentamine (TEPA, 98%, 30 grams) was then added to the well-stirred reaction mixture. Temperature of the reaction was increased to 130° C. and stirred for 3 hours or until completion of reaction.

Example 8

Synthesis of a Multiple Charged Cationic Compound/Surfactant

To a 250 mL three necked round-bottom flask equipped with temperature probe, condenser and magnetic stir bar were added compound of Example 7 (TEPA/$C_{12}$-$C_{14}$ alkylglycidyl ether, 1:3 adduct, 35.6 grams) and isopropanol (36 grams). (3-acrylamidopropyl)trimethylammonium chloride (APTAC, 75%, 24 grams) was then added into the flask. The resulting mixture was stirred at 70° C. overnight or until complete consumption of APTAC was achieved. As the reaction proceeded to completion suspension turned into a clear dark-amber solution.

Example 9

Synthesis of DETA/2EHGE (1:2) Adduct

To a 250 mL three necked round-bottom flask equipped with a temperature probe, condenser and magnetic stir bar was added 2-ethylhexyglycidal ether (2-EHGE, 55 grams). Diethylenetriamine (DETA, 15 grams) was then added to the well-stirred reaction mixture. Temperature of the reaction was increased to 130° C. and stirred for 3 hours or until completion of reaction.

Example 10

Synthesis of a Multiple Charged Cationic Compound/Surfactant

To a 250 mL three necked round-bottom flask equipped with a temperature probe, condenser and magnetic stir bar compound of Example 9 (DETA/2EHGE 1:2 adduct, 21.5 grams). (3-acrylamidopropyl)trimethylammonium chloride (APTAC, 75%) and water were added into the flask. The resulting suspension was stirred at 70° C. overnight or until complete consumption of APTAC was achieved. As the reaction proceeded to completion suspension turned into a clear yellowish solution.

Example 11

Effect of Some Exemplary Di-Cationic or Multiple Charged Cationic Compounds for Reducing Bacterial and Biofilm Growth Some exemplary di-cationic or multiple charged cationic compounds were tested for their efficacy to reduce bacterial or biofilm growth in the example. The structures of the compounds tested in this example are listed in Table 2.

Two different compositions containing single quaternary compounds were also prepared for comparison purposes. Single Quat 1 sample comprises about 50% by weight bisoctyl dimethyl ammonium chloride (CAS #5538-94-3) and about 5-10% by weight glycerin; and Single Quat 2 sample comprises about 50% by weight didecyl-dimethyl ammonium chloride (CAS #7173-51-5) and about 10-30% by weight ethanol. Different concentrations of the exemplary di-cationic or multiple charged cationic compounds and single quaternary compounds were tested ranging from about 0.8 ppm to about 1000 ppm.

The microbial and biofilm inhibition test protocols used in this example is similar to the MBEC (Minimum Biofilm Eradication Concentration) assay and American Society for Testing and Materials (ASTM) MBEC-E2799-12 (2011) assay, both of which are commonly used. This test protocol can be used laboratory and field applications.

The test protocol can be conducted in a 12-well or 96-well tissue culture plate format. The 12-well plate format is mainly for lab based and detailed screening/studies. The 96-well format is developed mainly for field applications.

The test protocol starts with the preparation of the water sample to be tested by mixing the water from different water systems or artificial water with known bacterial populations with limited nutrient (16% of medium, 2% (w/w) casitone, 0.8% (w/w) yeast extracts, 4% (v/v) glycerol, 4 ppm $FeCl_3$) and the solution of the treatment chemical. This step usually generates a series of the treated water samples with different concentrations for the treatment chemical(s) (from about 0.8 ppm to 1,000 ppm).

Next, 200 µL of each treated water samples were transferred to a 96 well plate or 12 well plate. Usually, six replicates would be tested for each concentration of the treatment chemical(s) and controls with no treatment chemical and no bacterial were also placed in the plate(s). After the treated samples were properly plated, the plate(s) are placed on a slow rotary shaker in a humidity-controlled environment on at 32-35° C. for 40-48 hours of incubation.

After the incubation, the bacterial growth in each well of the plate was recorded either visually or by a microplate turbidity reader at 650 nm to determine the minimum bacterial growth inhibition concentration for a treatment chemical.

After this step, the bacterial cultures in the plate(s) were carefully poured out and 250 ul of dyes (350 ppm 2-(4-Iodophenyl)-3-(4-nitrophenyl)-5-phenyltetrazolium chloride (INT) or 2,000 ppm crystal violent (CV) for biofilm matrix stain) was added to each well for activity stain in biofilms on well walls. After 10-15 minutes, pour out the dye and gently wash the wells with deionized water until no colored water is running of the plate(s). After drying the plate(s), each well was inspected visually for staining and results are recorded.

Alternatively, use 300 uL ethanol to extract CV dyes and transfer 200 uL of ethanol to a new plate for microtiter plate recording at 590 nm. These results led to the determination of the minimum biofilm inhibition concentration of the treatment chemical or composition.

The bacteria used in this example for microbial and/or biofilm growth inhibition test protocols comprised a mixture of aerobic populations from more than 30 cooling systems in North America. The specific species were not specifically identified. Those species were grown on R2A agar.

The test results are shown in Table 3 and Table 4 and compared with the results obtained when two single quat compositions or no chemical was used. In Tables 3 and 4, "−" indicates no detectable growth at the end of test, "+" indicates detectable growth, "+/−" partial growth, "++" more growth.

TABLE 2

Compounds Tested For Reducing Bacterial and Biofilm Growth

| Compound ID | Structure or Name |
|---|---|
| 1 | Compound of example 1 |
| 2 | Compound of example 2 |
| 3 | Compound of example 3 |
| 4 | Compound of example 4 |
| 5 | Compound of example 6 |
| 6 | Compound of example 8 |
| 7 | Compound of example 10 |
| 8 | H130 (single quat 1) |
| 9 | N90005 (single quat 2) |

TABLE 3

Effect of Some Exemplary Di-Cationic or Multiple charged cationic Compounds For Reducing Bacterial Growth

| Compound ID | Test Concentration (ppm) | | | | | | | | | | | |
|---|---|---|---|---|---|---|---|---|---|---|---|---|
| | 0.8 | 1.5 | 3 | 6 | 12 | 25 | 50 | 63 | 125 | 250 | 500 | 1000 |
| 1 | + | + | + | + | + | + | + | + | + | + | + | − |
| 2 | + | + | + | + | + | + | +/− | − | − | − | − | − |
| 3 | + | + | + | + | + | + | +/− | +/− | − | − | − | − |
| 4 | + | + | + | ++ | +/− | − | − | − | − | − | − | − |
| 5 | + | + | + | + | + | + | + | + | +/− | − | − | − |
| 6 | + | + | + | + | + | +/− | − | − | − | − | − | − |
| 7 | + | + | + | + | + | + | + | + | +/− | − | − | − |
| 8 | + | + | + | + | + | + | + | +/− | − | − | − | − |
| 9 | + | + | + | + | + | + | + | + | + | +/− | +/− | − |
| Control (no chemical) | + | + | + | + | + | + | + | + | + | + | + | + |

TABLE 4

Effect of Some Exemplary Di-Cationic or Multiple charged cationic Compounds For Reducing Biofilm Growth

| Compound ID | Test Concentration (ppm) | | | | | | | | | | | |
|---|---|---|---|---|---|---|---|---|---|---|---|---|
| | 0.8 | 1.5 | 3 | 6 | 12 | 25 | 50 | 63 | 125 | 250 | 500 | 1000 |
| 1 | + | + | + | + | + | + | + | + | + | +/− | − | − |
| 2 | + | + | + | + | + | +/− | − | − | − | − | − | − |
| 3 | + | + | + | + | +/− | +/− | +/− | − | − | − | − | − |
| 4 | + | + | +/− | − | − | − | − | − | − | − | − | − |
| 5 | + | + | + | +/− | +/− | +/− | +/− | − | − | − | − | − |
| 6 | + | + | + | +/− | − | − | − | − | − | − | − | − |
| 7 | + | + | + | +/− | +/− | +/− | +/− | +/− | +/− | − | − | − |
| 8 | + | + | + | + | + | +/− | − | − | +/− | +/− | − | − |
| 9 | + | + | + | + | ++ | ++ | ++ | ++ | +/− | +/− | +/− | − |
| Control (no chemical) | + | + | + | + | + | + | + | + | + | + | + | + |

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A method of controlling microbial fouling in a water system comprising:

providing a fouling control composition into a water system to generate a treated water system, wherein the fouling control composition comprises a compound or its salt and one or more fouling control composition agents;

wherein the compound or its salt is a di-cationic compound or a multiple charged cationic compound formed by a process derived from an aza-Michael Addition Reaction between a primary amine or polyamine and an α, β-unsaturated carbonyl compound according to the following formula

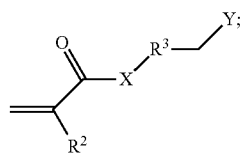

or from an aza-Michael Addition Reaction between a polyamine and an α, β-unsaturated carbonyl compound according to the following formula

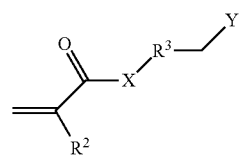

and a ring opening reaction from between the polyamine and an epoxide according to the following formula

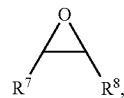

wherein X is NH or O;

$R^2$ is H, $CH_3$, or an unsubstituted, linear or branched $C_2$-$C_{10}$ alkyl, alkenyl, or alkynyl group;

$R^3$ is absent or an unsubstituted, linear or branched $C_1$-$C_{30}$ alkylene group;

Y is —$NR^4R^5R^{6(+)}$; $R^4$, $R^5$, and $R^6$ are independently a $C_1$-$C_{10}$ alkyl group;

$R^7$ is H or alkyl; and $R^8$ is alkyl, or —$(CH_2)_k$—O-alkyl, wherein k is an integer of 1-30; and wherein the compound is the di-cationic compound having two

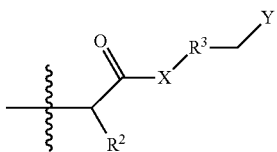

groups, the multiple charged cationic compound having 1, 2, 3, or more

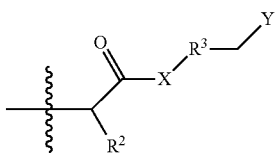

groups, or the multiple charged cationic compound having 1, 2, 3, or more

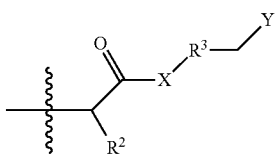

groups and at least one

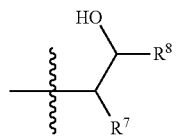

group.

2. The method according to claim 1, wherein the polyamine is $NH_2$—$[R^{10'}]_n$—$NH_2$, $(RNH)_n$—$RNH_2$, $H_2N$—$(RNH)_n$—$RNH_2$, or $H_2N$—$(RN(R'))_n$—$RNH_2$, wherein $R^{10'}$ is a linear or branched, unsubstituted or substituted $C_2$-$C_{10}$ alkylene group, or combination thereof; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$; and n is from 2 to 1,000,000.

3. The method according to claim 1, wherein the polyamine is (i) an unmodified polyamine, (ii) a modified polyamine, (iii) an ethoxylated polyamine, propylated polyamine, polyamine with polyquat, polyamine with polyglycerol, or combination thereof, or (iv) a linear, branched, or dendrimer polyethyleneimine.

4. The method according to claim 1, wherein the polyamine comprises (i) only primary and secondary amine groups, (ii) only primary, secondary, and tertiary amine groups, or (iii) only primary and tertiary amine groups.

5. The method according to claim 1, wherein the polyamine is (i) a single compound, or (ii) a mixture of two or more different polyamines, wherein the different polyamines have different molecular weight, different structure, or both.

6. The method according to claim 1, wherein the polyamine has an average molecular weight ($M_w$) of from about 60 to about 2,000,000 Da, or from about 60 to about 5,000 Da.

7. The method according to claim 1, wherein the epoxide is (i) an alkylglycidyl ether or 1,2-epoxyalkane, (ii) hexylglycidal ether, octylglycidal ether, dodecylglycidal ether, or a mixture thereof, or (iii) 1,2-epoxytertadecane, 1,2-epoxydodecane, or 1,2-epoxyoctane, or a mixture thereof.

8. The method according to claim 1, the compound is a multiple charged cationic compound having 2 or more positive charges, or 3 or more positive charges.

9. The method according to claim 1, wherein the compound is (i) a single multiple charged cationic compound, (ii) a mixture of two or more different compounds, wherein the two or more different compounds differ from one another by molecular weight, structure, net charge, or combination thereof, (iii) a mixture of at least two different multiple charged cationic compounds derived from the same polyamine and the α, β-unsaturated carbonyl compound derived from the same polyamine, α, β-unsaturated carbonyl compound, and epoxide, (iv) a mixture of at least two different multiple charged cationic compounds derived from different polyamines and the same α, β-unsaturated carbonyl compound from different polyamines and the same α, β-unsaturated carbonyl compound and epoxide, or (v) a mixture of at least two different multiple charged cationic compounds derived from different polyamines and different α, β-unsaturated carbonyl compounds or of at least two different multiple charged cationic compounds derived from different polyamines, α, β-unsaturated carbonyl compounds, and the same epoxide.

10. The method according to claim 1, wherein the compound has an average molecular weight ($M_w$) of from about 100 to about 2,000,000 Da and wherein the compound has (i) at least 10, 15, 20, or 30 positive charges, or (ii) at least 2, 3, 4, 5, 6, 7, or 8 positive charges.

11. The method according to claim 1, wherein the compound has average net charges of from 3 to 100.

12. The method according to claim 1, wherein the compound is a mixture derived from (i) a linear polyethyleneimine and (3-Acrylamidopropyl)trimethylammonium chloride (APTAC), [3-(Methacryloylamino)propyl]trimethylammonium chloride (MAPTAC), 2-(methacryloyloxy)-N,N,N-trimethylethanaminium chloride (DMAEMA-MCQ), N,N-dimethylaminoethyl acrylate benzyl chloride quaternary salt (DMAEA-BCQ), or 2-(methacryloyloxy)-N,N,N-trimethylethan-1-aminium methyl sulfate (DMAEMA-MSQ); or (ii) a branched polyethyleneimine and (3-acrylamidopropyl)trimethylammonium chloride (APTAC), [3-(methacryloylamino)propyl]trimethylammonium chloride (MAPTAC), 2-(methacryloyloxy)-N,N,N-trimethylethanaminium chloride (DMAEMA-MCQ), N,N-dimethylaminoethyl acrylate benzyl chloride quaternary salt (DMAEA-BCQ), or 2-(methacryloyloxy)-N,N,N-trimethylethan-1-aminium methyl sulfate (DMAEMA-MSQ).

13. The method according to claim 1, wherein the compound is derived from (i) a polyamine and (3-acrylamidopropyl)trimethylammonium chloride (APTAC) and a $C_{12}$-$C_{14}$ alkylglycidyl ether, or (ii) a polyamine and (3-acrylamidopropyl)trimethylammonium chloride (APTAC) and a 2-ethylhexylglycidyl ether.

14. The method according to claim 1, wherein the primary amine is $R^{11}NH_2$, wherein $R^{11}$ is $R^1$ or $R^1$—Z—$(CH_2)_m$—;

m is an integer of 1-4; $R^1$ is an unsubstituted or substituted, linear or branched $C_1$-$C_{30}$ alkyl, cyclic alkyl, alkenyl, or alkynyl group.

15. The method according to claim 1, wherein the compound is soluble or dispersible in water or the fouling control composition.

16. The method according to claim 1, wherein the fouling control composition comprises a carrier, and wherein the carrier is water, an organic solvent, or a mixture thereof.

17. The method according to claim 16, the organic solvent is an alcohol, a hydrocarbon, a ketone, an ether, an alkylene glycol, a glycol ether, an amide, a nitrile, a sulfoxide, an ester, or any combination thereof.

18. The method according to claim 16, wherein the organic solvent is (i) an alcohol, an alkylene glycol, an alkyleneglycol alkyl ether, or a combination thereof, (ii) methanol, ethanol, propanol, isopropanol, butanol, isobutanol, monoethyleneglycol, ethyleneglycol monobutyl ether, or a combination thereof, or (iii) methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, a mixture thereof with water, or any combination thereof.

19. The method according to claim 1, wherein the fouling control composition further comprises one or more corrosion inhibitors, and wherein the corrosion inhibitor is an imidazoline compound, a pyridinium compound, or a combination thereof.

20. The method according to claim 1, wherein the fouling control composition further comprises an additional fouling control composition agent, and wherein the additional fouling control composition agent is a single quaternary compound and optionally further comprises a biocide, wherein the biocide is chlorine, hypochlorite, $ClO_2$, bromine, ozone, hydrogen peroxide, peracetic acid, peroxycarboxylic acid, peroxycarboxylic acid composition, peroxysulphate, glutaraldehyde, dibromonitrilopropionamide, isothiazolone, terbutylazine, polymeric biguanide, methylene bisthiocyanate, tetrakis hydroxymethyl phosphonium sulphate, and any combination thereof.

21. The method according to claim 1, wherein the fouling control composition further comprises an organic sulfur compound, wherein the organic sulfur compound is a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof.

22. The method according to claim 1, wherein the fouling control composition further comprises from about 1 wt-% to about 20 wt-% of an acid, and wherein the acid is hydrochloric acid, hydrofluoric acid, citric acid, formic acid, acetic acid, or a mixture thereof.

23. The method according to claim 1, wherein the fouling control composition further comprises a hydrogen sulfide scavenger, and wherein the hydrogen sulfide scavenger comprises an oxidant, inorganic peroxide, sodium peroxide, chlorine dioxide, a $C_1$-$C_{10}$ aldehyde, formaldehyde, glyoxal, glutaraldehyde, acrolein or methacrolein, a triazine, monoethanolamine triazine, monomethylamine triazine, or a mixture thereof.

24. The method according to claim 1, wherein the fouling control composition further comprises a surfactant comprising a nonionic, semi-nonionic, cationic, anionic, amphoteric, zwitterionic, Gemini, di-cationic, di-anionic surfactant, or a mixture thereof.

25. The method according to claim 1, wherein the fouling control composition further comprises an asphaltene inhibitor, a paraffin inhibitor, a scale inhibitor, a gas hydrate inhibitor, a pH modifier, an emulsion breaker, reverse emulsion breaker, coagulant/flocculant agent, an emulsifier, a water clarifier, a dispersant, antioxidant, polymer degradation prevention agent, permeability modifier, foaming agent, antifoaming agent, emulsifying agent, scavenger agent for $CO_2$, and/or $O_2$, gelling agent, lubricant, friction reducing agent, salt, or a mixture thereof.

26. The method according to claim 1, wherein the fouling control composition is a liquid, gel, or a mixture comprising liquid/gel and solid.

27. The method according to claim 1, wherein the fouling control composition or a use solution thereof has a pH of from about 2 to about 11.

28. The method according to claim 1, wherein the fouling control composition comprises from about 0.1 wt-% to about 5 wt-% of the compound or mixture thereof.

29. The method according to claim 1, wherein the compound or a mixture thereof has a concentration of from about 0.001 ppm to about 5000 ppm in the treated water system.

30. The method according to claim 1, wherein the compound is provided to the water system independently, simultaneously, or sequentially with an additional fouling control composition agent(s), and wherein the water system comprises fresh water, recycled water, salt water, surface water, produced water, or mixture thereof.

31. The method according to claim 30, wherein the water system is a cooling water system, boiler water system, petroleum wells, downhole formations, geothermal wells, mineral washing, flotation and benefaction, papermaking, gas scrubbers, air washers, continuous casting processes in the metallurgical industry, air conditioning and refrigeration, water reclamation, water purification, membrane filtration, food processing, clarifiers, municipal sewage treatment, municipal water treatment, or potable water system.

32. A fouling control composition comprising:
one or more additional fouling control agents; and
a compound or its salt comprising a di-cationic compound or a multiple charged cationic compound formed by a process derived from an aza-Michael Addition Reaction between a primary amine or polyamine and an α,β-unsaturated carbonyl compound according to the following formula

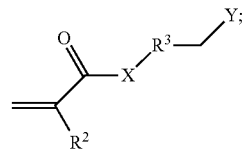

or from an aza-Michael Addition Reaction between a polyamine and an α, β-unsaturated carbonyl compound according to the following formula

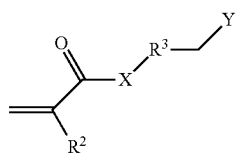

and a ring opening reaction from between the polyamine and an epoxide according to the following formula

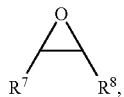

wherein X is NH or O;
R² is H, CH₃, or an unsubstituted, linear or branched C₂-C₁₀ alkyl, alkenyl, or alkynyl group;
R³ is absent or an unsubstituted, linear or branched C₁-C₃₀ alkylene group;
Y is —NR⁴R⁵R⁶⁽⁺⁾ or a salt thereof;
R⁴, R⁵, and R⁶ are independently a C₁-C₁₀ alkyl group, and
R⁷ is H or alkyl; and
R⁸ is alkyl, or —(CH₂)ₖ—O-alkyl, wherein k is an integer of 1-30; and
wherein the compound the di-cationic compound having two

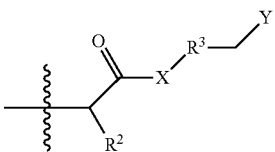

groups, the multiple charged cationic compound having 1, 2, 3, or more

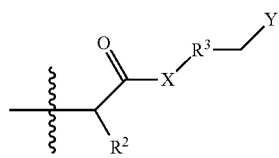

groups, or the multiple charged cationic compound having 1, 2, 3, or more

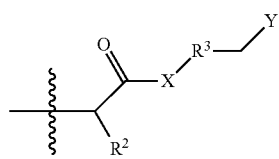

groups and at least one

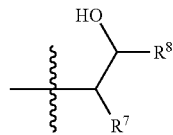

group.

* * * * *

UNITED STATES PATENT AND TRADEMARK OFFICE
CERTIFICATE OF CORRECTION

| | |
|---|---|
| PATENT NO. | : 12,082,580 B2 |
| APPLICATION NO. | : 17/304041 |
| DATED | : September 10, 2024 |
| INVENTOR(S) | : Ashish Dhawan et al. |

Page 1 of 1

It is certified that error appears in the above-identified patent and that said Letters Patent is hereby corrected as shown below:

In the Claims

<u>In Claim 7, Column 54, Line 8:</u>
DELETE: "1,2-epoxytertadecane,"
INSERT: --1,2-epoxytetradecane,--

<u>In Claim 32, Column 57, Line 28:</u>
DELETE: "wherein the compound the di-cationic"
INSERT: --wherein the compound is the di-cationic--

Signed and Sealed this
Eighteenth Day of March, 2025

Coke Morgan Stewart
*Acting Director of the United States Patent and Trademark Office*